United States Patent
Sachs et al.

(10) Patent No.: US 6,596,224 B1
(45) Date of Patent: Jul. 22, 2003

(54) JETTING LAYERS OF POWDER AND THE FORMATION OF FINE POWDER BEDS THEREBY

(75) Inventors: Emanuel M. Sachs, Newton, MA (US); Michael J. Cima, Winchester, MA (US); Michael A. Caradonna, Los Altos, CA (US); Jason Grau, Chicago, IL (US); James G. Serdy, Boston, MA (US); Patrick C. Saxton, Hanahan, SC (US); Scott A. Uhland, Somerville, MA (US); Jooho Moon, Nagoya (JP)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/445,670
(22) PCT Filed: Jun. 12, 1998
(86) PCT No.: PCT/US98/12280
§ 371 (c)(1), (2), (4) Date: Mar. 1, 2000
(87) PCT Pub. No.: WO98/56566
PCT Pub. Date: Dec. 17, 1998

Related U.S. Application Data

(60) Provisional application No. 60/050,015, filed on Jun. 13, 1997, and provisional application No. 60/018,316, filed on May 24, 1996.

(51) Int. Cl.⁷ .............................. B22F 7/02; B32B 7/12; B32B 15/01; B32B 18/00; B32B 3/00
(52) U.S. Cl. .............................. 419/6; 419/36; 264/113; 264/128; 264/642; 264/651; 264/669; 425/78; 425/84
(58) Field of Search ....................... 419/6, 36; 264/642, 264/651, 669, 113, 128; 425/78, 84

(56) References Cited

U.S. PATENT DOCUMENTS

| | | | |
|---|---|---|---|
| 5,204,055 A | * 4/1993 | Sachs et al. | 419/2 |
| 5,207,371 A | * 5/1993 | Prinz et al. | 228/125 |
| 5,301,415 A | * 4/1994 | Prinz et al. | 29/458 |
| 5,340,656 A | * 8/1994 | Sachs et al. | 428/546 |
| 5,687,788 A | * 11/1997 | Caldarise et al. | 164/456 |
| 5,697,043 A | * 12/1997 | Baskaran et al. | 419/30 |
| 5,940,674 A | * 8/1999 | Sachs et al. | 419/2 |

* cited by examiner

*Primary Examiner*—Daniel J. Jenkins
(74) *Attorney, Agent, or Firm*—Steven J. Weissburg

(57) ABSTRACT

A powder bed (32) is built up by repeated deposition of a slurry that contains powder. Layers are made by depositing a liquid dispersion of the desired powdered material, which then slip-casts into the forming powder bed to make a new layer (34). The slurry may be deposited in any suitable manner, such as by raster or vector scanning, or by a plurality of simultaneous jets that coalesce before the liquid slip-casts into the bed, or by individual drops, the deposits of which are individually controlled, thereby generating a regular surface for each layer.

56 Claims, 19 Drawing Sheets

JETTING LAYERS OF POWDER AND THE FORMATION OF FINE POWDER BEDS THEREBY

RELATED APPLICATIONS

Priority is claimed to U.S. Provisional application No. 60/050,015 filed on Jun. 13, 1997, in the names of several of the present inventors and others, entitled FINE POWDER HANDLING TECHNIQUES AND SYSTEMS, INCLUDING JETTING LAYERS AND PRINTING STYLES FOR FINE POWDER. That provisional application is incorporated fully herein by reference.

GOVERNMENT RIGHTS

The United States Government has certain rights in this invention pursuant to the DARPA/ONR Solid Freeform Fabrication program under Contract/Grant No. N000149410832.

BACKGROUND

This invention relates to ceramic and metal containing parts that are formed from powder, and more particularly to such parts made from fine powder. Structural ceramic parts are generally made of fine powders, typically on the order of 1 micron in size. Such powders are difficult to spread dry, as they tend to agglomerate. Use of such fine powders offers several advantages. First the use of fine powders enhances sinterability. Sintering is a solid state diffusion process and will be enhanced by increasing the surface area to volume ratio of the powder in any green part that is subsequently sintered. As is known, surface roughness can be no smaller than the powder size. Thus, using fine powders also enables overall part quality to be improved. Smaller powders also mean that the minimum feature size that can be specified is also improved. Lastly, smaller powders allow thinner layers to be used in any layered fabrication technique, which helps eliminate slicing defects such as stair-stepping.

A processing technique that uses powders has become known as "three-dimensional printing" ("3D Printing") and is described in general in numerous patents, including: U.S. Pat. No. 5,204,055, entitled THREE-DIMENSIONAL PRINTING TECHNIQUES, by Sachs, Haggerty, Cima, and Williams; U.S. Pat. No. 5,340,656, entitled THREE-DIMENSIONAL PRINTING TECHNIQUES, by Sachs, Haggerty, Cima, and Williams; U.S. Pat. No. 5,387,380, entitled THREE-DIMENSIONAL PRINTING TECHNIQUES, by Cima, Sachs, Fan, Bredt, Michaels, Khanuja, Lauder, Lee, Brancazio, Curodeau, and Tuerck; U.S. Pat. No. 5,490,882, entitled PROCESS FOR REMOVING LOOSE POWDER PARTICLES FROM INTERIOR PASSAGES OF A BODY, by Sachs, Cima, Bredt, and Khanuja; and U.S. Pat. No. 5,660,621, entitled BINDER COMPOSITION FOR USE IN THREE-DIMENSIONAL PRINTING, by James Bredt. All of the foregoing 3D Printing patents are incorporated herein fully by reference.

3D Printing is also disclosed and discussed in, co-assigned applications, including: U.S. Ser. No. 08/600, 215, filed Feb. 12, 1996, entitled CERAMIC MOLD FINISHING TECHNIQUES FOR REMOVING POWDER, by Sachs, Cima, Bredt, Khanuja, and Yu; U.S. Ser. No. 08/596, 707, filed Feb. 5, 1996, entitled HIGH SPEED, HIGH QUALITY THREE DIMENSIONAL PRINTING, by Sachs, Curodeau, Fan, Bredt, Cima, and Brancazio; U.S. Ser. No. 08/856,515, filed May 15, 1997, entitled CONTINUOUS INK-JET DROPLET GENERATOR, by Sachs and Serdy; U.S. Ser. No. 08/551,012, filed Oct. 31, 1995, entitled ENHANCEMENT OF THERMAL PROPERTIES OF TOOLING MADE BY SOLID FREE FORM FABRICATION TECHNIQUES, by Allen, Michaels, and Sachs; U.S. Ser. No. 08/831,636, filed Apr. 9, 1997, entitled THREE DIMENSIONAL PRODUCT MANUFACTURE USING MASKS, by Sachs and Cima; and U.S. Ser. No. 60/060,090, filed Sep. 26, 1997, entitled REACTIVE BINDERS FOR METAL PARTS PRODUCED BY THREE DIMENSIONAL PRINTING, by Sachs, Yoo, Allen, and Cima (provisional application). All of the foregoing 3D Printing patent applications (and provisional application) are incorporated herein fully by reference.

Basically, the 3D Printing process is a Solid Freeform Fabrication (SFF) process, which allows parts to be created directly from computer models. Other SFF processes that are commonly used include stereolithography (SLA), selective laser sintering (SLS), laminated object manufacturing (LOM), and fused deposition modeling (FDM). These processes all differ from traditional machining, since material is added to the desired part, as opposed to material removal in milling, turning, and boring.

A typical implementation of the 3D Printing process begins with the definition of a three-dimensional geometry using computer-aided design (CAD) software. This CAD data is then processed with software that slices the model into many thin layers, which are essentially two-dimensional. A physical part is then created by the successive printing of these layers to recreate the desired geometry. An individual layer is printed by first spreading a thin layer of powder and then printing binder to adhere the powder together in selected regions to create the desired layer pattern. The growing part is lowered by a piston and a new layer of powder is spread on top. This process is repeated until all the layers have been printed. The binder joins powder together within a layer and between layers. After printing is complete, the unbound powder is removed, leaving a part with the desired geometry. Typically the part is a green part that will experience further processing, such as sintering. However, in some circumstances, the part may be a final part.

This traditional 3D Printing layer generation technique relies on the powder being flowable in order for smooth layers of uniform density to be created.

There are many different powder and binder systems, based on metal, or ceramic or polymer powder. The part can be sintered or infiltrated to full density. Because 3D Printing is an additive manufacturing process, many geometries are possible that are not feasible with traditional machining, such as undercuts and internal cavities. Furthermore, many materials can be used in the 3D Printing process, as long as they can be obtained in powdered form. Currently, work has been done using metal, polymer, ceramic, and glass-ceramic powders. Using these materials, a wide variety of parts have been produced. This includes the direct printing of metal parts, injection molding tooling, casting shells, and structural ceramics. Parts, such as tooling, can incorporate conformal cooling channels to surfaces to decrease cycle time and residual stresses in parts made with such tooling. Other types of parts can also include such channels. Using the 3D Printing process, it is also possible to make individual parts with regions composed of varying materials (functionally gradient materials). This can be achieved by printing different materials into selected regions of an individual layer. This extra degree of freedom allows designers to vary the material properties within a single part.

Despite the many advantages of using fine powders mentioned above, they are difficult to use in the known 3D Printing process for a variety of reasons. Fine powder particles tend to stick to each other, forming agglomerates, due to various reasons, including Van der Waal's attractive forces, and moisture. The particles also tend to stick to any other bodies they come into contact with, including powder piston walls and the powder spreader bar. Low flowability also occurs because very fine particles are typically irregularly shaped, increasing friction. Poor flowability combined with powder adherence to the spreader bar makes it difficult to spread smooth layers. The low flowability of the powder also inevitably leads to uneven densification within layers and consequently, the resulting green body. Further, it is difficult to print into fine powders, without problems of ballistic ejection and erosion due to the binder jet impinging on the power bed surface.

Another problem with forming parts from powder relates to packing density and sintering. Much work has been done with spherical granules, typically ranging from 30–100 $\mu$m in size. The granules are actually agglomerates of submicron powder bound together-by an organic phase with a typical packing density of about 50% of theoretical. As a result, the packing density of the resulting green part is too low to be sintered directly (typically 30–35% of theoretical). An iso-static pressing step is required to increase the green body packing density. After iso-static pressing, alumina green parts fabricated with spray dried powders exhibit packing densities ranging from 59–63% of theoretical, depending on whether the cold iso-static pressing (CIP) or the warm iso-static pressing (WIP) process is used. This is adequate to achieve full density during sintering.

However, use of these processes introduces several problems. Before sintering, green parts are quite fragile and easy to damage. Pressing requires a relatively large amount of part handling. Further, the pressing step can introduce density gradients within the green part. This can cause problems during sintering, such as warping and anisotropic shrinkage. A final disadvantage of the iso-static pressing step is that it raises production costs.

Attempts have been made to eliminate the iso-static pressing post processing step, by increasing the printed part packing density. It has been suggested to print slurry of the desired material into spray dried granules, in order to increase the powder bed packing density. However, that process also has drawbacks.

Accordingly, for the foregoing reasons, there is a need for processes that allow the formation of powder beds with uniform properties, that are made up of fine powders. Techniques are also required to handle fine powder that overcomes the problems of agglomeration and poor flowability experienced with dry powders. There is also a need for a process to establish a fine powder bed to enable using 3D Printing with fine powders, to minimize or eliminate problems of ballistic disturbance. Similarly, there is a need to develop a high density powder bed. An additional need is to create parts from powder beds that can be directly sintered, or which can be sintered without deleterious pre-sintering steps.

Thus, the several goals and objects of the invention include to form beds of fine powder with uniform properties. Another object of the invention is to enable handling fine powders without undue agglomeration, and with acceptable flowability. A further object of the invention is to enable 3D printing using fine powder beds, resulting in smooth surfaced objects having very fine features and controllable dimensions. Yet another object of the-invention is to facilitate fabrication of parts from fine powder in high density beds, using 3D Printing, which parts can be sintered directly from green parts, without any difficult preparatory pre-sintering steps.

SUMMARY

In general, according to the present invention, a powder bed is built up by repeated deposition of a slurry that contains the powder. Layers of powder are made by depositing a liquid dispersion of the desired powdered material, which then slip-casts into the forming powder bed to make a new layer. Fine powder beds can thus be made without the flowability problems associated with dry powder handling discussed above. The slurry may be deposited in any suitable manner, including depositing in separate, distinct lines, such as by raster or vector scanning, or by a plurality of simultaneous jets that coalesce before the liquid slip-casts into the bed, or by individual drops, the deposit of which are individually controlled, thereby generating a regular surface for each layer. Liquid is removed from the bed first by slip-casting and then by drying, such as with heat, after deposition of each layer. The powder bed can be used for various processes. If the 3D Printing process is being used, then after each layer of powder is jetted and dried, the next step is to print a pattern of binder for the layer under construction. There may be a drying step after the binder deposition. These steps of slurry jetting, liquid reduction, (slip-casting; drying) binder deposition, and (optionally) binder drying, are repeated until the desired number of binder patterned layers have been built up. The intermediate product is at this point a block of powder. The unbound powder is dispersed, typically by immersion in a solvent (water is typical). The resulting part is typically a green part suitable for densification, either by sintering or infiltration, as is known, with care taken to accommodate the binder/powder system chosen.

A preferred embodiment of the invention is a method for creating a powder containing body. The method includes the steps of: providing a support; over a selected area of the support, depositing in a continuous stream a liquid slurry that contains a first powdered material to form a first layer of powdered material; maintaining the deposited layer region of powdered material under conditions such that the liquid content of the first layer is reduced; and over a portion of the selected area of the support, depositing in a continuous stream the liquid slurry to form an additional layer. Typically, the method includes many repetitions of the steps of maintaining and depositing the slurry until a desired thickness of powdered material has been deposited. Reduction of the liquid content is typically effected by allowing the liquid of the slurry to slip into porosities of a previously deposited layer. Subsequent drying, for instance, by heating, is also typically practiced.

The step of depositing the slurry may be accomplished by rastering a jethead over a selected area, and jetting slurry while rastering. Rather than rastering, vectoring motion can also be used. Alternatively, a jethead can be passed over the portion of the selected area while simultaneously jetting a plurality of parallel streams of the slurry from the jethead onto the portion of the selected area.

If a plurality of streams are deposited, it is particularly beneficial to jet them onto the portion of the selected area such that each of the streams is deposited closely enough to an adjacent stream in space and time such that, upon contact with a previously deposited layer, liquid from adjacent streams merges before the liquid has completely slipped down into porosities of the previously deposited layer.

Typically, when using a plurality of streams, they are spaced apart a distance of between 1.5 and 6.0 diameters of the streams, and preferably between 2 and 4 diameters.

Such timing and placement can also be accomplished by serial application of streams, either by rastering, or by a rotating arrangement, where relative rotation is set up between a support and a slurry deposition unit. Either the support or the deposition unit can be moved.

The slurry may contain particles of between 0.2 and 10.0 microns, preferably of between 0.5 and 2 microns.

The slurry may be deposited through a nozzle having a greatest orifice dimension of between 50 and 1000 microns and preferably between 100 and 400 microns.

The orifice(s) may be circular in cross-section, or elongated. If elongated, typically the aspect ratio is greater than 3:1.

The slurry typically has a solids volume fraction of between 5 and 55, and preferably between 10 and 40.

The method of the invention can be practiced using powders of metal, ceramic and polymers. More than one type of slurry may be used.

An additional aspect of the invention is to measure the height of the deposited additional layer at selected locations of the selected area and to adjust the rate of delivery of slurry at selected locations of subsequently deposited layers, based on the measured height at the selected locations of the additional layer. The rate of delivery can be adjusted by adjusting the speed by which the jet head passes over the surface. If a plurality of streams are deposited simultaneously, the rate of delivery of slurry among the plurality of parallel streams can be varied to correct for any irregularity in surface height.

Lines of slurry of a subsequent layer can be jetted in register or offset from lines of slurry of a preceding layer. Further, a first set of spaced apart streams of slurry can be deposited, with a second set of streams being deposited subsequently, each stream of the second set being deposited between a pair of adjacent spaced apart streams of the first set.

Another preferred aspect of the invention is to deposit additional layers of slurry of a thickness such that that a film forms, including the deposited slurry and previously deposited powder, the film having a saturation thickness, $h_{sat}$, that is less than a critical cracking thickness CCT. In addition, it is an aspect of the invention to avoid layer cracking by adjusting at least one of the following factors as indicated: increasing the volume fraction VF of the slurry; decreasing the surface tension, $\gamma_{LV}$, of the slurry; increasing the fracture resistance, $K_c$ of the film; increasing the contact angle, $\theta$, of the slurry on the solid phase; and increasing the pore radius of the film.

According to another embodiment of the method of the invention, the invention is a method for creating a powder containing body, including using a binder. This embodiment of the invention includes the steps of providing a support; over a selected area of the support, depositing a liquid slurry that contains a first powdered material to form a first layer of powdered material; maintaining the deposited layer of powdered material under conditions such that the liquid content of the first layer is reduced; depositing a binder material at selected regions of the layer, which binder will cause the layer to become bound at the selected regions, and successive layers to become bound to each other at the selected regions; and over a portion of the selected area of the support, depositing liquid slurry to form an additional layer region.

The binder can be printed or deposited through a mask. The slurry can be deposited as a continuous stream, or as individually controlled droplets.

Typically, this embodiment of the method includes further the steps of repeating the maintaining, depositing a binder material and depositing slurry steps a plurality of times until a desired thickness of powdered material has been deposited.

All of the other variations and features mentioned above, in connection with making a three dimensional object, without regard to whether a binder material is provided, are also applicable to the embodiment of the invention in which a binder is used. There are also additional features.

A preferred aspect of the invention is to include a redispersant agent in the slurry composition. Preferably, the redispersant is: soluble in the liquid used to form the slurry; soluble in a liquid medium that can redisperse the formed layers of powder; and soluble in any liquid vehicle of the binder material. Further, it is a preferred embodiment of the invention for the redispersant to be substantially the last of any material of the slurry to slip cast during drying, such that residues thereof form at necks between powder particles.

According to yet another preferred embodiment, the binder should penetrate into pores of the powder bed; bind the powder in the presence of any re-dispersing agent; and be insoluble in any liquid used for re-dispersion of any unbound powder. The binder may be a heat curable polymer, and the method of the invention may include a step of heat treating the formed powder bed to cure the binder.

Still another aspect of this embodiment of the invention is that, after the desired number of jetted layers of powder with printed regions of binder has been produced, unbound powder is dispersed from bound powder, such as by contacting the unbound powder with a solvent.

The method may be practiced with a non translating support, over which a slurry deposition unit and a binder deposition unit pass, repeatedly, layer after layer. Two or more of each can be incorporated into the same, stationary set up. Alternatively, the support can move from one stage to another, each stage having its own slurry deposition unit(s) and binder deposition unit(s). Such a production line set up can follow any path, including a linear, or cyclic path.

Yet another preferred embodiment of the invention is a process for making a component comprising the steps of: depositing a layer of a powder material in a region by jetting a slurry that contains the powder material; applying a further material to one or more selected regions of the layer of powder material which will cause the layer of powder material to become bonded at the one or more selected regions; repeating the layer depositing step and further material application steps a selected number of times to produce a selected number of successive layers, the further material causing said successive layers to become bonded to each other; and removing unbonded powder material which is not at said one or more selected regions to provide the component.

Another preferred embodiment of the invention is an apparatus for making three-dimensional objects comprising: a support having a surface; a slurry delivery unit; a slurry delivery drive unit, configured to drive the slurry delivery unit to deposit a layer of slurry over a selected region of the surface; a liquid reduction unit arranged to reduce the liquid content of a layer of deposited slurry; a binder delivery unit; and a binder delivery drive unit configured to deposit binder material at selected regions of a layer of deposited slurry.

According to a preferred embodiment, the slurry delivery unit has a nozzle, which may have an orifice having a greatest opening dimension of between 50 and 1000 microns, and preferably between 100 and 400 microns.

The slurry delivery unit may also comprise a head having a plurality of spaced apart orifices, of the same size range, which may be spaced apart from each other between 1.5 and 6 diameters of a slurry stream jetted from an orifice, and preferably between 2 and 4 diameters.

According to still another preferred embodiment, the slurry deliver drive unit is configured to raster the slurry delivery unit over the surface of the support. Alternatively, it may be configured to sweep or vector the slurry delivery unit across the surface of the support.

Yet another preferred embodiment of the invention includes a layer surface height measurement unit and a surface height control module that takes as an input a signal from the surface height measurement unit and uses that signal to vary the delivery of slurry so as to control the height of the surface that is formed. The surface height measurement unit may comprise a laser rangefinder.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
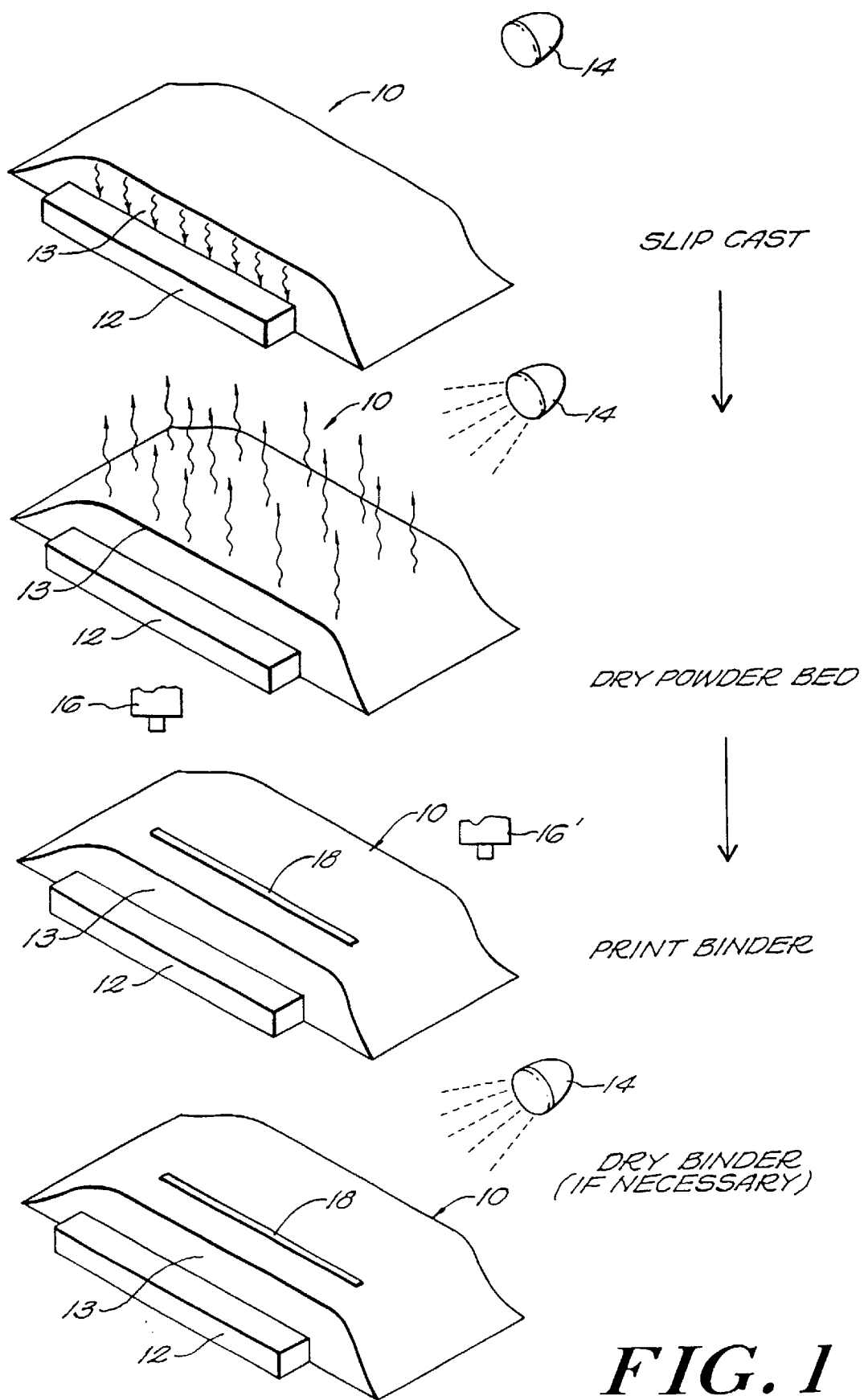
FIG. 1 is a schematic rendition showing basic steps of a preferred embodiment of the method of the invention, showing the building up of a powder bed using slurry, and the printing of binder upon layers thereof.
Figure 14A:
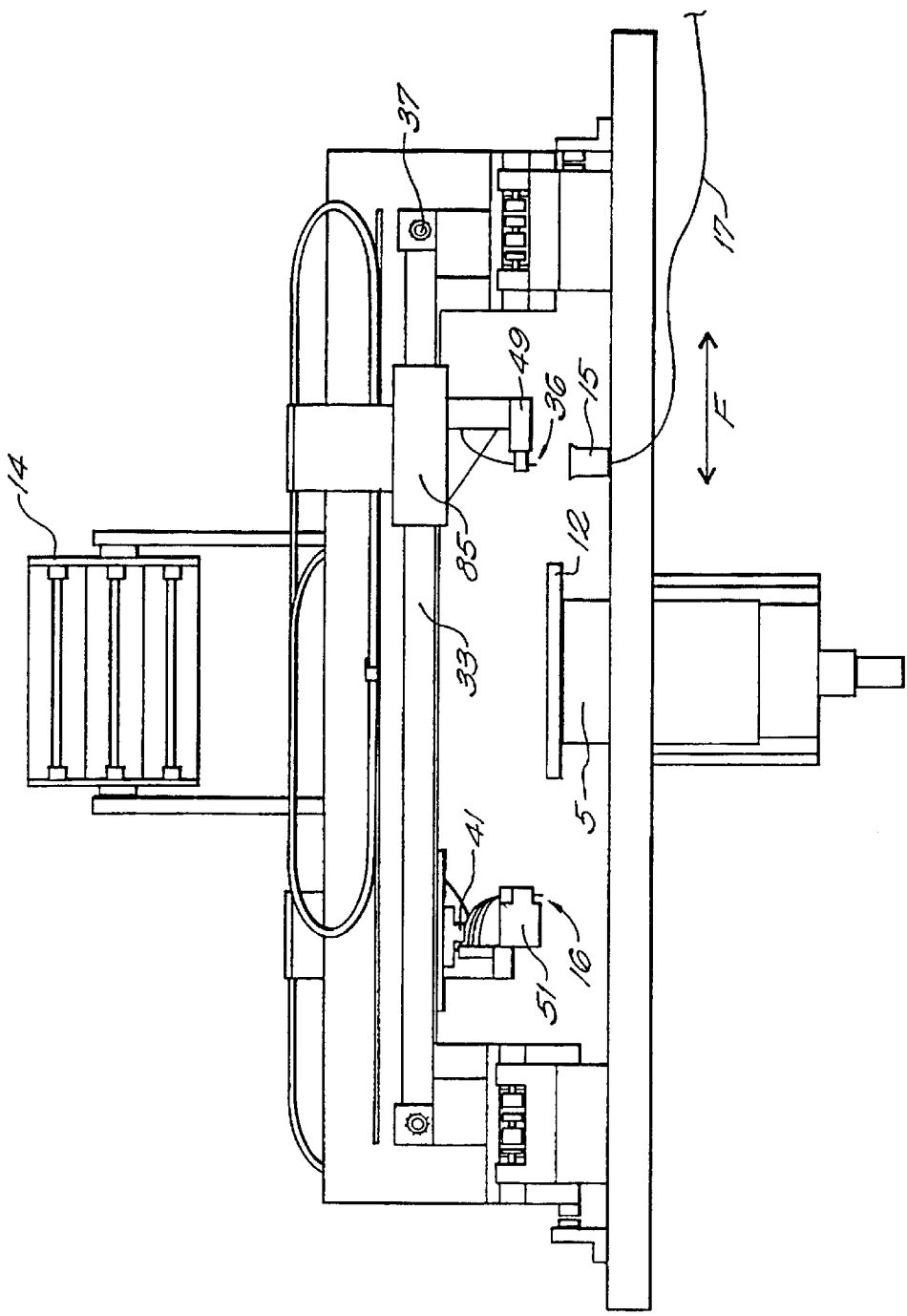
FIGS. 14A and 14B are schematic representations in elevation and plan views, respectively, of an apparatus for practicing the methods of the invention, including a slurry drive and slurry deposition head, (two of each in FIG. 14B), along with a binder drive and binder deposition head.
Figure 14B:
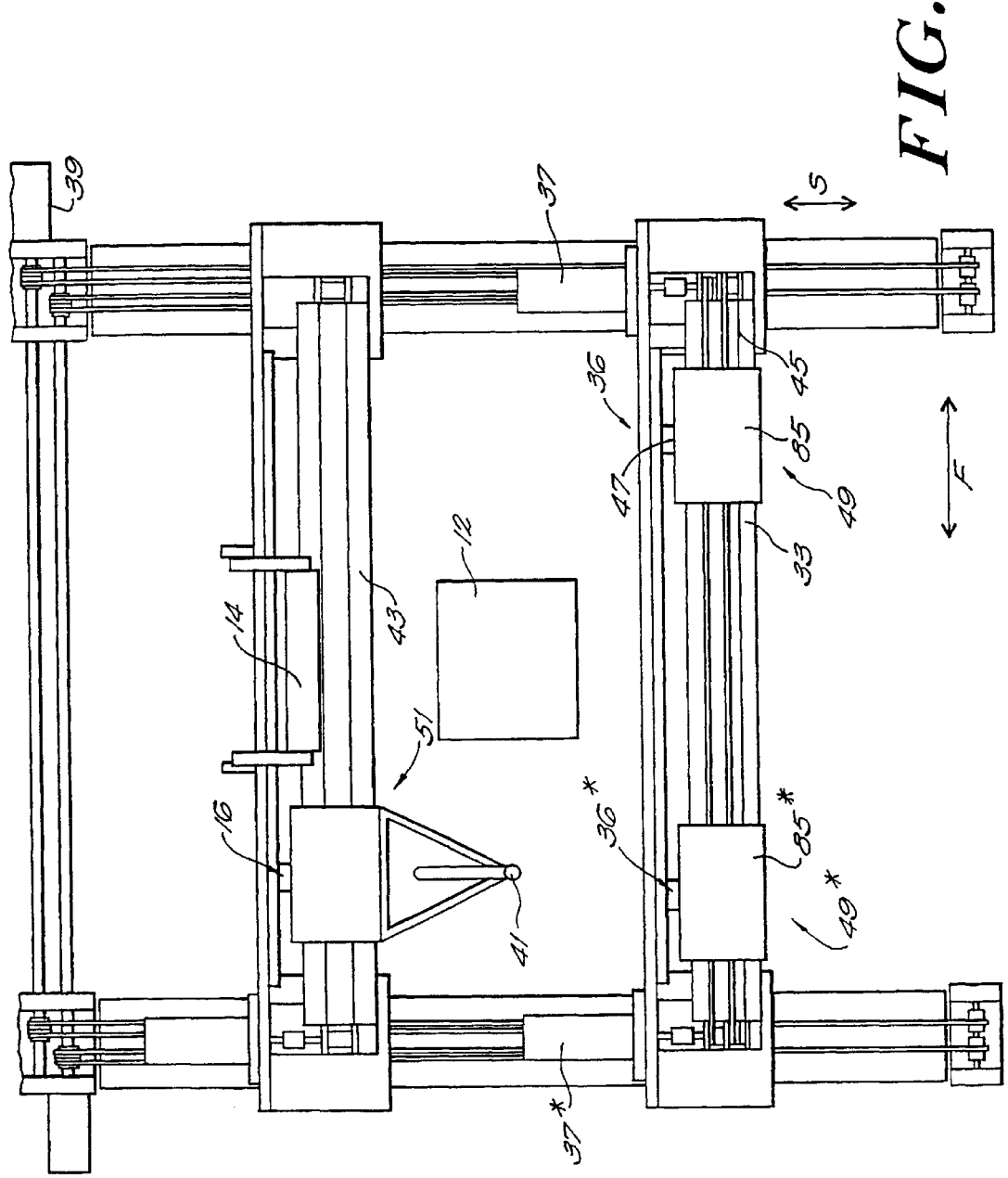

A preferred general embodiment of the invention is shown schematically with reference to FIGS. 1, 14A and 14B. In general, a powder bed is built up by the repeated application of layers of slurry. Such a powder bed may be used for various purposes, and an aspect of the invention is the method and apparatus for the creation of the powder bed itself, without regard to the use to which the powder bed will be put. In the examples discussed below, the powder bed is primarily used in connection with the 3D Printing process. However, it need not be. The method and apparatus for producing the powder bed by jetting slurry are novel and useful in their own right, and useful with Solid Free Form fabrication, in general, both, without regard to their usefulness in connection with 3D Printing.

The first step, of creating a layer, is implemented by depositing slurry 10 evenly over the area of the powder bed 13 (several methods by which the slurry is delivered to the powder bed surface are discussed below). A porous substrate 12 is generally provided to support the first layer. Plaster is a suitable substrate. Others include: bisque fired alumina and sintered borosilicate glass. Immediately after deposition, the liquid vehicle of the slurry begins to slip-cast into the porosities of the powder bed (or porous substrate) (indicated by the downward pointing arrows) to form a new layer. Because the thickness of slurry pooled on the powder bed surface is quite small, the new layer slip casts quite quickly. The liquid vehicle in the slurry begins to absorb (under capillary pressure) into the porous bed 13, which has, during the previous cycle(s), been dried or partly dried. In a short time, for instance on the order of one second, the vehicle will be absorbed to the point where the slurry is no longer supersaturated and is sufficiently concentrated that the particles can no longer, on average, get any closer. At this point, the material has a yield stress and behaves more like a solid than a liquid.

To prevent water trapped in the slip cast layer from interacting with any binder to be printed, a drying (evaporation) step is then performed to remove some or all of the liquid vehicle. This may be accomplished with a lamp 14, or any suitable means, such as hot air over the surface or radiation that is absorbed throughout the thickness of the layer, which, in the case of water, is by microwave irradiation. This also helps prevent cracking of the powder bed. After drying, the step of printing binder into the new layer is performed, such as by a binder nozzle 16. A printed pattern 18 of binder is printed on the layer of powder. Depending on the binder used, drying may or may not be required after this step as well. This process (deposit slurry; slip-cast; dry; deposit binder; dry binder) is then repeated until the part to be printed is complete.

Figure 2A:
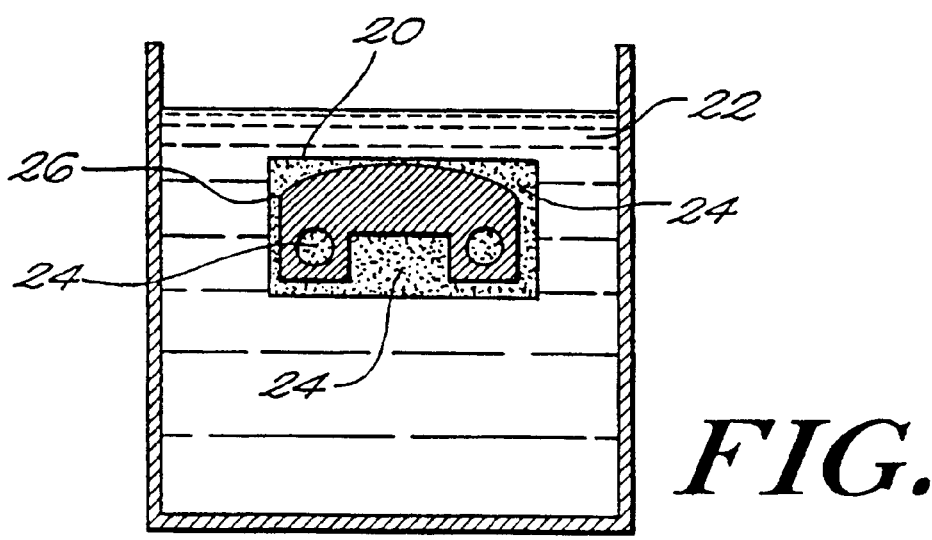
FIGS. 2A and 2B are schematic renditions showing further basic steps of a preferred embodiment of the method of the invention, showing the redispersion of unbound powder and the resulting part.
Figure 2B:
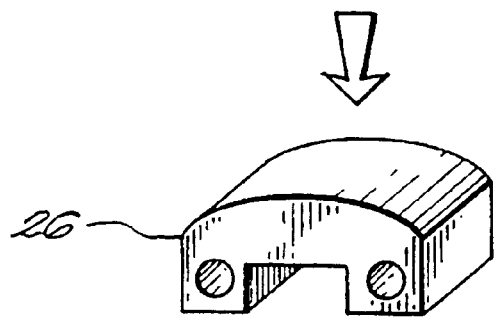
Figure 4:
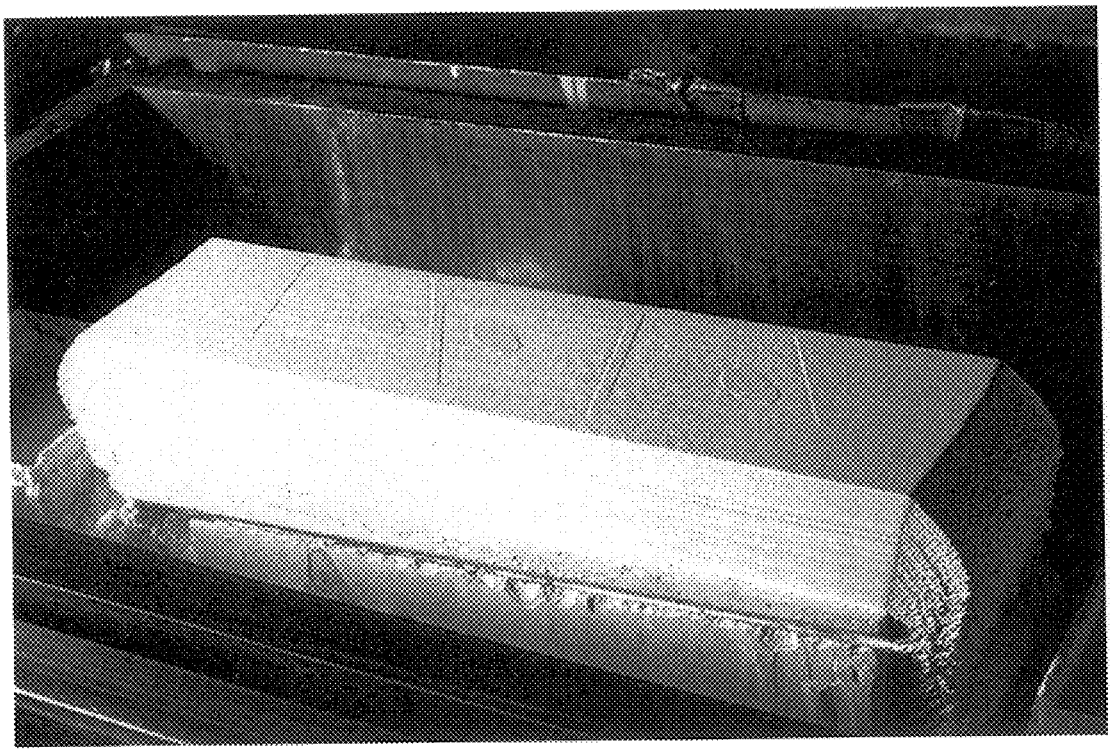
FIG. 4 is a photograph of a powder bed made by jetting layers of slurry, with three parts that have been formed by printed binders, showing, among other things, how the jetted slurry extends beyond the edges of the support along the fast axis.
Figure 20:
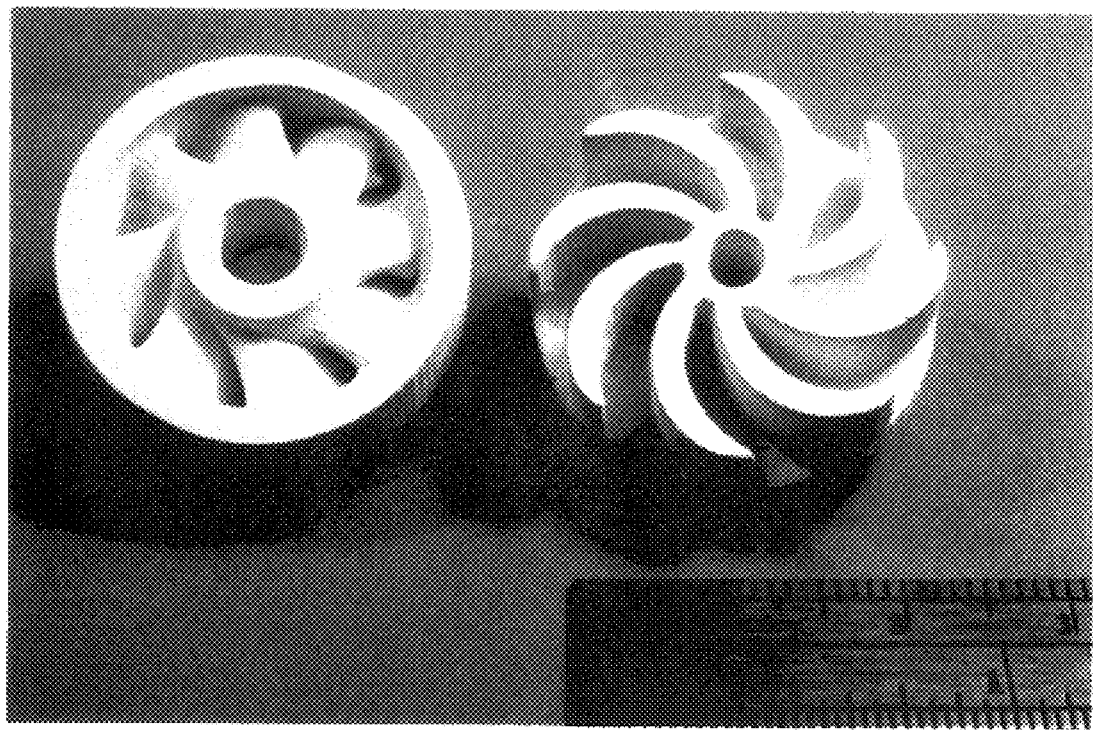
FIG. 20 is a photograph that shows two different green parts that have been made by printing binder into a powder bed of jetted slurry.

At this point, the result is a cake of dried powder with binder printed in selected locations, which defines a desired geometry. FIG. 4 is a photograph showing a jetted powder bed that contains three printed binder parts (each having a trapezoidal cross-section with a circular opening). To remove the part from the powder bed, the cake 20 of printed powder is immersed in a solvent 22 (water, in many cases, such as for alumina and silicon nitride powder), as shown schematically in FIG. 2A, to redisperse the unbound powder 24 and to separate it from the bound powder 26 formed by the pattern 18 of printed binder. Care must be taken to allow the solvent to fully penetrate the porosity of the part without trapping air, for example, by slow immersion of the part. This means that the binder must be insoluble in the solvent after the binder has dried. Some form of mechanical agitation may be necessary to aid the redispersion process, so the binder must be strong enough to resist this. After the excess powder is redispersed, the green part 26 can be removed. FIG. 20, which is a photograph, shows two green parts made according to the foregoing process. The green part typically has a packing density in excess of 50%. Thus, the part can then be sintered directly without any iso-static pressing steps.

The slurry-based 3D Printing process offers a number of advantages over the traditional 3D Printing process. First, very fine, submicron powders, can be used. This means that parts with very fine details and very thin layers can be fabricated. Layers having a thickness of 10 microns or less can be made. Such small layers significantly reduce surface irregularities due to slicing. Slurry-based 3D Printing processes can be used for virtually any material that can be obtained as a fine powder and dispersed. Consequently, there are quite a few material systems that could be used. A further important advantage is that green parts can be fabricated with packing densities exceeding 50% of theoretical, without pre-sintering processing. This substantially simplifies the process, speeds it up and makes the fabrication of complex geometries easier.

Figure 3:
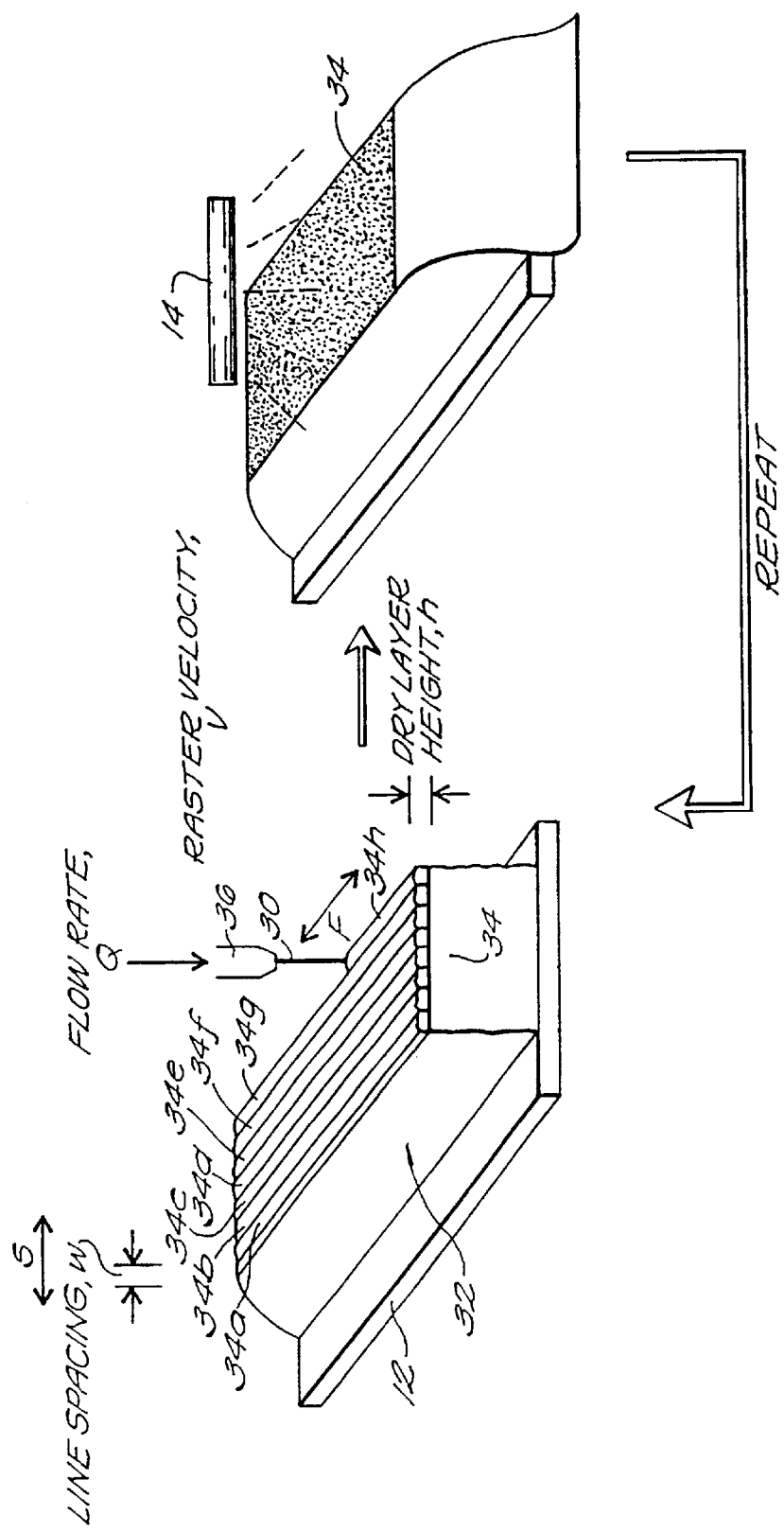
FIG. 3 is a schematic rendition showing the steps of printing and drying slurry with multiple sequentially deposited lines of jetted slurry.

In a preferred implementation of this invention, as shown schematically in FIGS. 3, 14A and 14B, a single jet 30 of slurry is dispensed from a single nozzle 36, which is raster scanned back and forth on track 33 by a carriage 85 driven by motor 37 over the surface of the already formed powder bed 32 to define a new layer 34. It is important to keep in mind that the slurry nozzle 36 is different from the binder nozzle 16, shown in FIG. 1. A typical size for the orifice of the nozzle is between 50 and 1,000 microns, with a preferable range for the orifice diameter of between 100 and 400 microns.

Figure 8:
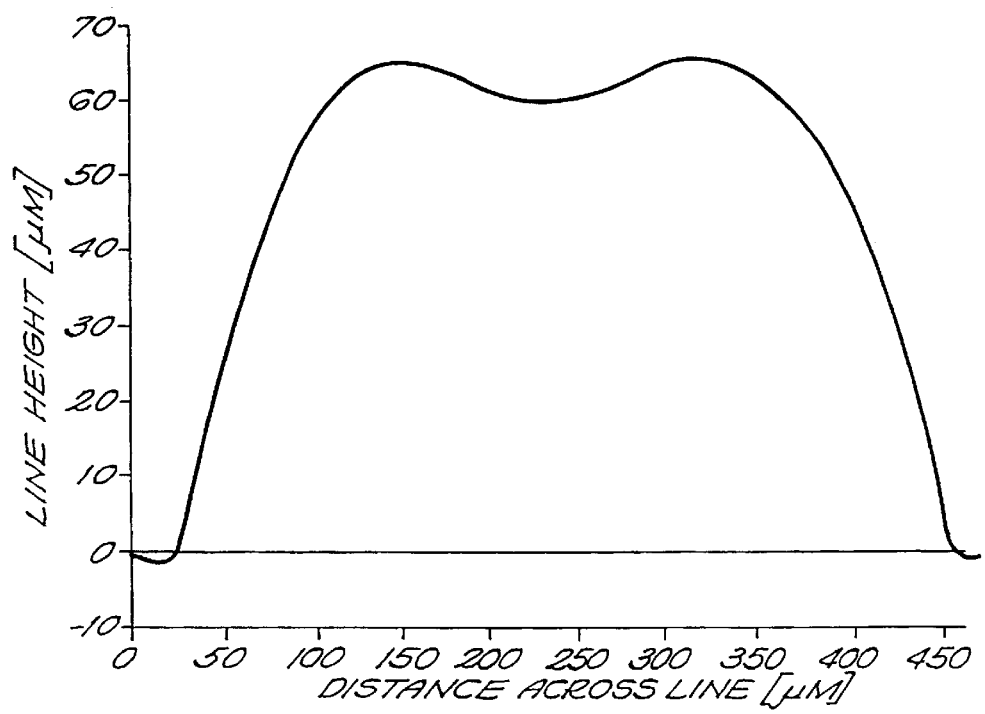
FIG. 8 is a graphical representation of the cross-section of a typical line of deposited slurry.

The raster motion has a "fast axis" (indicated by the two headed arrow F) and a "slow axis" (indicated by the two headed arrow S). The track 33 (FIG. 14B) is itself driven along the slow axis, such as by a motor 39. The entire area of the support 12 over which it is desired to build the powder bed is swept out, by rastering one line at a time. (As shown in FIG. 3, the individually dispensed lines 34a, 34b, 34f are shown as adjacent elongated strips. In actual practice, individual lines typically have a cross-section as shown schematically in FIG. 8. It should be noted that the horizontal and vertical scales of FIG. 8 are different from each other.)

A typical apparatus, as shown in FIG. 14A, supports the support 12 on a piston 5, which is lowered after creation of a new layer. Thus, the support structure for the slurry jethead 49 and the binder printhead 51 remains at a fixed height. The piston 5 may be lowered after the drying step, for instance, or, after the slurry deposition step.

Figure 21A:
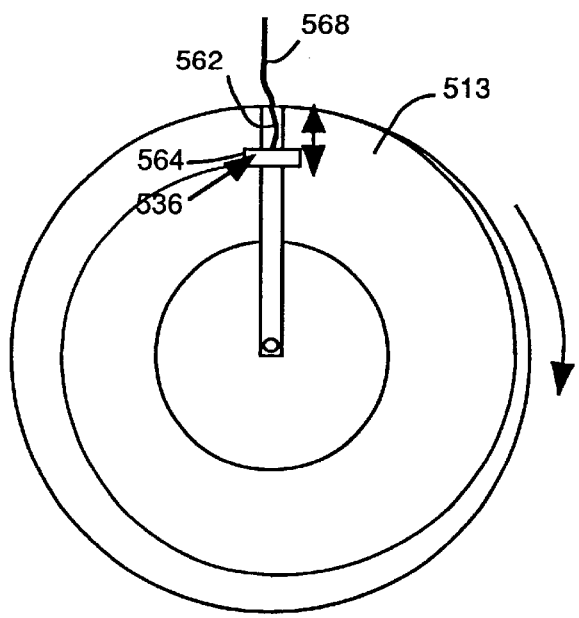
FIG. 21A is a schematic rendition of an apparatus for the jetting of a powder bed, having a rotating support and a stationary slurry jetting head.

As shown in FIG. 3, and generally throughout this disclosure, the area covered by the building powder bed is rectangular. However, this need not be the case. Any shape that can be generated, such as by raster or vector scanning or any other suitable means can be achieved. For example, a circular ring or disk shape can be fabricated by rotating a bed under a nozzle, which is translated along a radial line (as shown in FIG. 21A). Further, powder beds with shapes of high complexity can be created by scanning a nozzle in a vector path around the periphery of the shape and then filling the area in with further vector scans. As is discussed below, slurry deposition by jetting provides crisp edge definition on edges parallel to the fast axis.

On edges that are perpendicular to the fast axis, the edges are typically not crisp, and, in fact, there is typically significant overflow at these areas. (Such overflow is shown schematically in FIG. 3 at the end of the powder bed that is away from the reader. The front end is shown broken away, for illustrative purposes.) Overflow occurs because, for a typical arrangement, the slurry jet is not turned off as it approaches and passes beyond the edge of the substrate. Similarly, as the jet indexes along the slow direction and reverses direction, to jet the adjacent line, it stays on, eventually impinging at the edge of the support, and traveling along. Such "overflow" can be seen in FIG. 4, particularly at the edge shown on the right hand side of the photograph. As shown in FIG. 14A, a catcher cup 15 catches slurry at times when it is not being jetted onto the support, and may recirculate it to the slurry supply (not shown) or collect it for other recycling, through line 17.

It is also possible to turn the jet "off" or otherwise to prevent the slurry stream from impinging on the growing powder bed at times, for instance by using a jetting mechanism that turns the slurry supply off and on before the nozzle, (such as with a fast acting solenoid or pinch valve) or that has continuous flow at the nozzle, but which deflects slurry into a slurry gutter. In such a case, edge definition along the edges perpendicular to the fast axis may be possible, which is good, although not as fine as along the fast axis. If the slurry supply is turned off and on at the nozzle, care must be taken to insure that slurry does not dry appreciably at the nozzle orifice, as this will result in flow irregularities upon resumption of flow.

Of high importance is the uniform distribution of the slurry over the surface so that the resulting layer of slip cast powder is itself uniform in thickness. A key aspect of the current invention is to maintain accurate and reproducible control over the metering, and distribution of slurry. This is especially important in that the slurry is being dispensed onto a porous surface and liquid vehicle is being absorbed beginning immediately upon contact with this porous surface.

The importance maybe illustrated by consideration of, for example, the case of spraying of the slurry onto the surface with an air atomizing device. In a random spray, a droplet of slurry that arrives at the surface of the powder bed in a region where no droplet has landed previously, will sit for an undetermined length of time, before another droplet impinges on the surface close enough to the first droplet to touch it. The first droplet might be still nearly fully liquid, or might be fully slip cast onto the surface of the powder bed or be at any state intermediate when a second droplet arrives and touches it. The result is a lack of control over the process of depositing slurry, with the resulting possibility of creation of defects within the powder bed. (It will be understood that for the fabrication of parts from fine powders, especially fine ceramic powders, the creation or inclusion of defects in the green part must be avoided. In structural ceramic parts, such defects may lead to substantially reduced strengths of the sintered component.) Thus, a key aspect of the current invention is to control the time period between deposition of various segments of the new layer.

Figure 5:
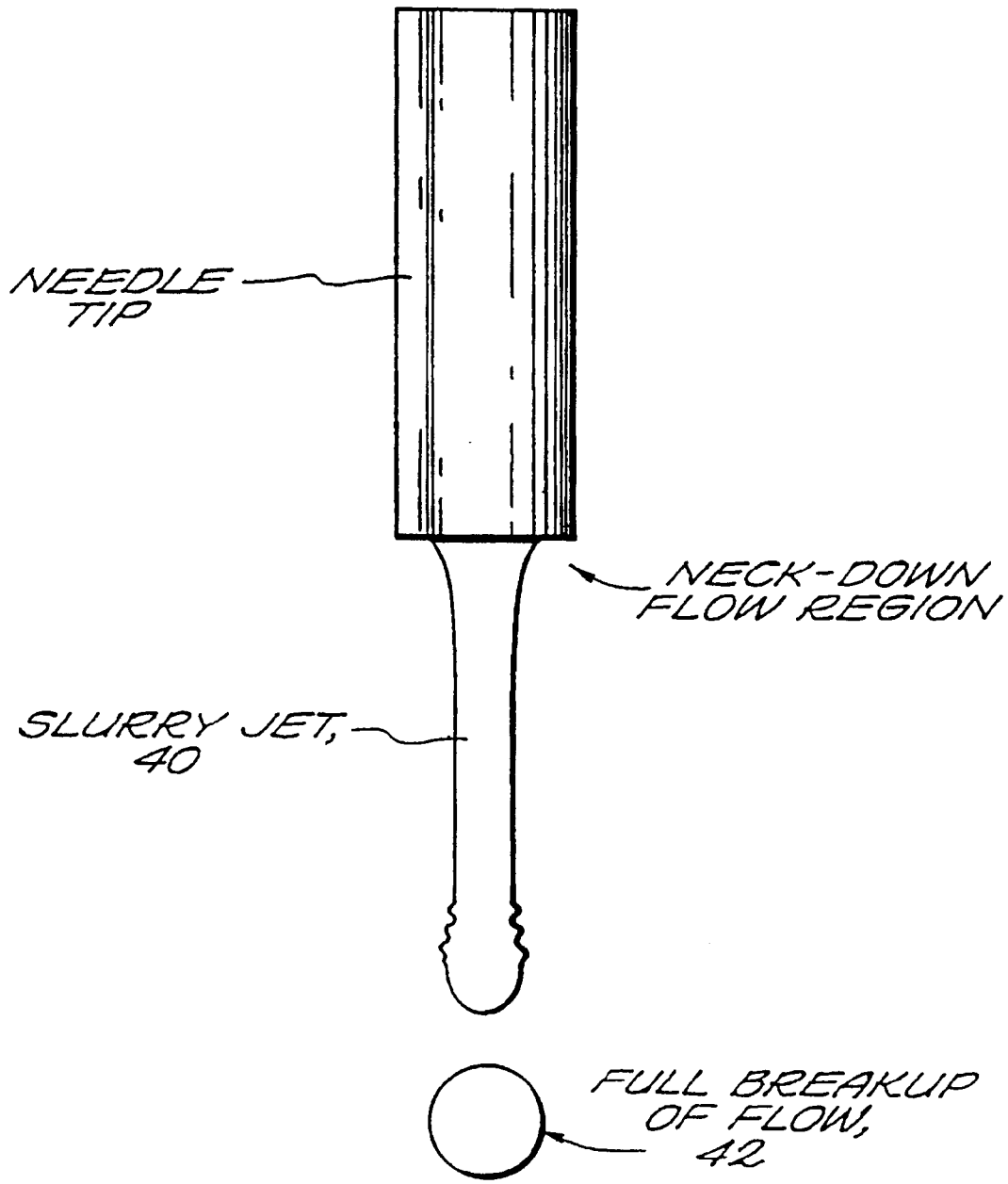
FIG. 5 is a schematic rendition of a stream of slurry, and transition into droplets.

Typically, as shown schematically in FIG. 5, in one preferred embodiment, the jet 30 is caused to hit the powder bed as a continuous stream 40, rather than as a discontinuous flow of drops 42. One reason to use a continuous jet is to maintain the desired control over the time period between deposition of various segments of the new layer mentioned above. How to achieve this is discussed further below. (There are, however, times when it is advantageous to have the slurry hit the powder bed as individual droplets. An individual droplet embodiment is also discussed further below.)

CALCULATION OF LAYER THICKNESS

Jetting slurry enables very localized control of the layer build process. In a single jet embodiment of the process of the invention, it is helpful for analysis to consider, as a fundamental unit, the individual line. When a line is printed, it slip casts on the powder bed relatively quickly. Slip casting may be completed before or after the next line is printed. The resulting nominal build height of a layer can be quantified with knowledge of the raster velocity, line spacing, flow rate, and packing fraction of the powder bed and volume fraction of the slurry. FIG. 3 shows the important parameters in building a layer.

The layer thickness that will build up may be determined as follows. Assuming that the slurry printed in each pass is constrained by the neighboring lines, the wet height, h*, of a printed line before slip casting or drying takes place is given by $$h^* = \frac{Q \cdot 10^6}{60 \cdot w \cdot v}, \quad (1)$$

where the units of the variables are: h* [$\mu$m], Q (flow rate) [cc/min], w (line spacing) [$\mu$m], and v (raster velocity) [m/sec]. Equation (1) is derived by calculating the volume of slurry dispensed and dividing by the area over which is it dispensed.

The final height (h) of the resulting dry layer, will be determined by the solids volume fraction of the slurry, VF, and the packing fraction (packing density) of the resulting powder bed, PF, as follows.

$$h = \frac{VF}{PF} \cdot (h^*). \quad (2)$$

The units of h are the same as those of h*. Equation (2) takes into account both the volume of powder contained in the slurry and the packing of this powder in the final layer.

Casting of thin granular ceramic film layers is practiced in many applications. These include deposition of glazes, thick films for electronics, and face coats for investment casting. Particles are dispersed in a liquid medium and cast as a slurry on a substrate. Experience has shown that such films tend to crack during drying when a single application of material is used to make thick films. Previous studies-have shown that a critical thickness exists above which the film will spontaneously crack, independent of the drying rate. This phenomena is discussed below, but the existence of such a critical cracking thickness (CCT) suggests that arbitrarily thick layers can be obtained by repeated application of layers with thickness less than the CCT. This criterion has proved, however, to be insufficient. Indeed, it has been found that the layer thickness, above which cracking occurs when cast on previously cast layers, is a function of the particles, liquid media, and especially the solids loading of the slurry. Some guidelines are provided here as to how to properly select the layer height so that cast layers upon previously cast layers are stable with respect to cracking. This technology is important to any solid freeform fabrication method which deposits layers as slurries, which are then dried, such 3D Printing.

Earlier work studied the drying behavior of granular ceramic films on a rigid dense substrate. They analyzed the fracture behavior of films assuming a biaxial stress develops due to the capillary tension in the pore liquid. The ceramic film was constrained in the earlier study by the rigid substrate and the drying stress is as high as the capillary pressure of the liquid, given by $$J = \frac{2\gamma_{LV} \cos\theta}{r_{pore}}, \quad (3)$$

where $\gamma_{LV}$ is the surface tension of the-liquid, $\theta$ is the contact angle of the liquid on the solid phase, and is the pore radius in the granular film. A CCT exists in this case because thicker films store sufficient elastic energy to propagate a crack. Thin films have insufficient energy and the CCT is the thickness where the elastic energy released is just sufficient to propagate the crack. The CCT depends on the biaxial stress, J, to which the film is exposed and the fracture resistance, $K_c$, of the film. The relationship can be approximated by the following equation $$CCT = \left(\frac{K_c}{1.4J}\right)^2. \quad (4)$$

$K_c$ for ceramic films is dependent upon film composition, particle size, packing density, and may be increased by addition of organic binders.

Figure 6A:
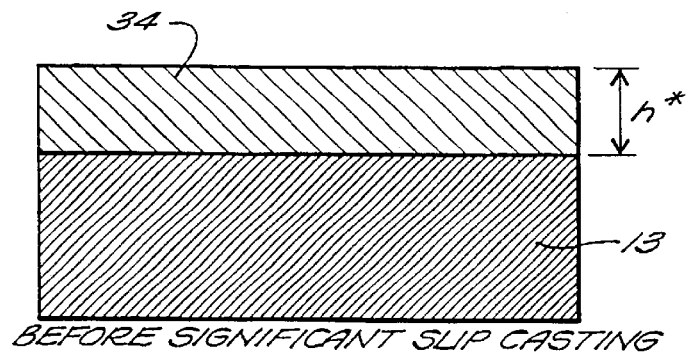
FIGS. 6A and 6B are schematic renditions showing the deposition and slip casting of a dose of slurry.
Figure 6B:
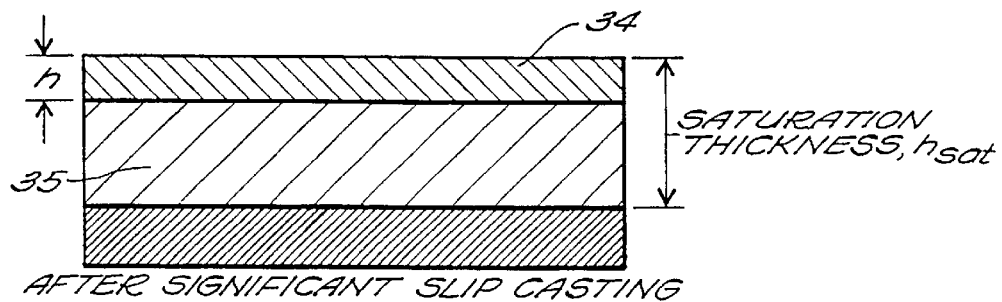

The case of repeated casting of thin granular films upon one another does not reflect a simple CCT as found in the above mentioned study. Rather, the cracking behavior is dependent upon the amount of liquid that is deposited and the type of powder that is used, among other parameters. A new criterion must be met to prevent cracking in bodies produced by repeatedly cast layers. A new variable, saturation thickness, $h_{sat}$, is the thickness of region that would be 100% saturated by the total liquid deposited with a given layer. This film region is the region for which the film properties mentioned above are evaluated. Such a film forms upon the deposition of the slurry, and is made up of newly deposited material, as well as material that had been previously deposited. It is shown in FIG. 6B. This thickness is calculated by the following relationship:

$$h_{sat} = h^*\left(\frac{\text{liquid fraction of slurry}}{\text{pore fraction of cast material}}\right) \quad (5)$$

$$= h^*\left(\frac{1 - \text{solid volume fraction of slurry}}{1 - \text{packing fraction of powder bed}}\right)$$

$$= h^*\left(\frac{1 - VF}{1 - PF}\right),$$

where h* is the thickness of deposited slurry. The variable, $h_{sat}$, must be smaller than the CCT of the material to insure that no cracks form upon repeated casting of layers. The relationship for $h_{sat}$ may be expressed in terms of the printing parameters defined above as follows:

$$h_{sat} = \frac{Q \cdot 10^6}{60 \cdot w \cdot v}\left(\frac{1 - VF}{1 - PF}\right). \quad (6)$$

Figure 7:
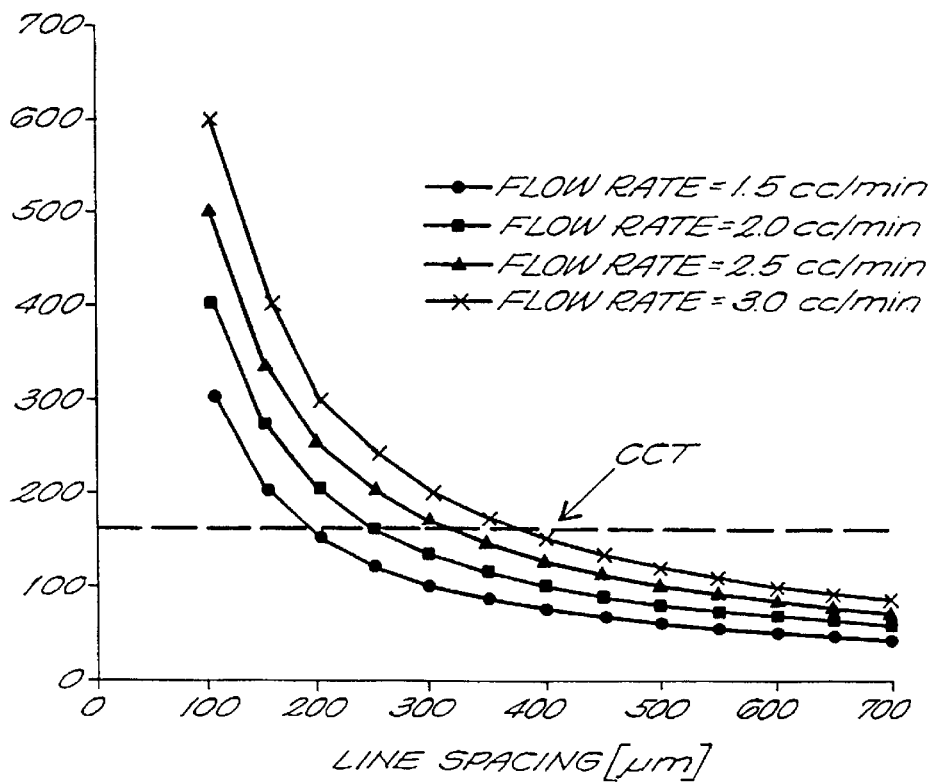
FIG. 7 is a graphical representation showing the relationship between saturation thickness and line spacing for several different flow rates of slurry.

As an example, assuming the use of 35% volume fraction alumina slurry and a packing fraction of 55%, plots of the saturation thickness as a function of line spacing and slurry flow rate are shown in FIG. 7 for a raster speed of 1.2 m/sec. A horizontal line representing a hypothetical CCT is shown. Any portion of the curves below the line would represent acceptable operating points. It should be noted that this criterion is conservative to the extent that cast liquid will actually exist over a region that is slightly larger than $h_{sat}$, because of the nature of percolative infiltration of the liquid into the porous structure of the previously cast layers. The stress is subsequently smaller because of the reduced saturation.

When choosing printing parameters, Eq.(6) should be used to check that the effective layer height does not exceed the CCT of the slurry type being used.

It has been found that suitable volume fractions range between 5 and 55%, with the range of between 10 and 40% being preferred.

Based on the relationships described above it can be seen that cracking can be avoided by either or both increasing the CST and decreasing the saturation thickness. For a given choice of powder, the CCT can be increased by increasing the fracture resistance of the film. This can be accomplished by the addition of plasticizing agents to the slurry, such as soluble polymers like PEG. The CCT can also be increased by decreasing the capillary pressure, by decreasing the surface tension of the liquid, for example by the addition of surfactants or by changing the vehicle. For example a mixture of alcohol (such as methyl alcohol) and water has a lower surface tension than water alone. The capillary pressure can also be decreased by increasing the contact angle of the liquid to the powder, however, this may have deleterious effects on consistency of the slip casting. The pore radius of a film made from a given powder can be increased slightly through the addition of flocculating agents, thus also decreasing the capillary pressure and increasing the CCT. The saturation thickness may be decreased by using a slurry of higher volume fraction powder and of course, by decreasing the thickness of the layer of slurry deposited (and therefore of the final layer of powder deposited).

Another parameter that affects the process is the temperature of the growing powder bed. Increasing the temperature of the bed will typically result in faster absorption of the liquid vehicle and will also reduce the time required for drying of the powder bed. For instance, if the slurry is water based, then the powder bed may typically be maintained at a temperature of up to 80° C., below the boiling point of the liquid.

When determining an optimal set of printing parameters for attaining good layer surface finish, it is important to consider all the variables. The most important variables are:

Raster speed
Line spacing
Flow rate
Intra layer line placement
Inter layer line placement
Nozzle orifice size
Slurry solids loading
Slurry particle size
Slurry wetting angle
Powder bed temperature
Dwell time between lines in a layer Not all of these parameters are necessarily independent.

Returning to consideration of the conditions of jet delivery, what follows is a more detailed consideration of the behavior of the slurry after deposition. In a preferred embodiment, the jet 30 is caused to impinge on the powder bed as a continuous stream, by choosing the spacing between the orifice and the powder bed. As shown in FIG. 5, as the jet leaves the nozzle, it necks down to a narrower diameter, and remains a continuous stream for some distance. Further downstream, the jet enters an irregular flow region, which is followed by a full break up of flow, caused by Rayleigh instability. It is frequently useful to have the jet contact the powder bed before the break up. A typical distance between the orifice and the powder bed for a 350 micron diameter jet is 4–5 mm. If the jet is allowed, or caused to break up into droplets prior to impact on the surface, as discussed above, some individual droplets will begin to slip cast while they are still isolated islands. If this slip casting is too fast, this may lead to defects in the powder bed, such as voids at the interfaces between droplets. For this reason, having the jet arrive as a continuous stream is typically preferred. (However, below, also is discussed an embodiment where the jet is allowed to break up.)

When the jet of slurry hits the powder bed, it "splats" or spreads outward. If a stationary jet having a circular cross section is incident on a powder bed normal to the powder bed surface, the fluid will change direction and flow out in a roughly circular pattern, with its velocity parallel to the surface of the powder bed. If the jet is incident on a non porous substrate, the slurry would form a stationary pool, which would grow with time. If such a jet is traversed across the surface of a non porous substrate, it will deposit a line of liquid. The width of this line of liquid will depend on: the amount of liquid dispensed per length of line; the velocity with which the jet is incident on the surface; the viscosity of the liquid and the conditions of wetting between the liquid and the surface. The amount of liquid dispensed per length of line may be calculated by taking the flow rate of the jet and dividing by the velocity of traverse.

As the amount of liquid dispensed per length of line increases, the width of the line will increase. As the velocity of the jet increases, the width of the line will increase. As the viscosity of the liquid increases, the width of the line will decrease. As the wetting angle between the liquid and the surface increases (i.e., as there is less effective wetting), the width of the line will decrease.

In contrast, when a jet is traversed across a porous surface, as is the case with jetting of slurry upon previously deposited layers of powder, the width of the line tends to be less than for jetting upon a solid surface of the same wetting characteristics, due to absorption of the liquid into the body beyond the surface. In the case of jetting a slurry, the absorption of the liquid vehicle into the substrate results in an increase in the viscosity of the slurry remaining on the surface (and it's eventual slip casting). This effect can result in line widths that are less than that which would result on a non porous surface.

In general, the time scale over which the splatting occurs may be on the order of 10–500 μs (microseconds).

After the slurry is deposited on the substrate (either a porous substrate or a previously deposited porous powder layer), the liquid content of the layer of deposited slurry is reduced. Typically two phenomena contribute to this reduction: slip casting and drying. These two phenomena are understood with reference to FIGS. 6A and 6B. As soon as a newly deposited layer 34 of slurry is dispensed onto the surface of the porous powder bed 13, the liquid vehicle in the slurry begins to absorb (under capillary pressure) into the porous bed 13, which has, during the previous cycle(s), been dried or partially dried. In a short time, for example, on the order of one second, the vehicle will be absorbed to the point where the slurry is no longer supersaturated and is sufficiently concentrated that the particles can no longer densify. At this point the material has a yield stress and behaves more like a solid than a liquid. Thus, the splatting mechanism described above, which transpires over a time on the order of 10–500 μs, is essentially completed long before any significant slip casting has occurred. A portion 35 of the already formed and dried powder bed 13 will again become saturated by excess water from the new layer, resulting in a total thickness of saturated powder of $h_{sat}$, both already resident and newly deposited.

After depositing a layer of slurry, the powder bed must be dried or partially dried, to open up some porosity for the printing of the binder and for other reasons. This drying may be accomplished with the aid of quartz heating lamps (such as shown at 14 in FIG. 1) and will typically take 10–60 seconds. Thus, a portion of the bed is repeatedly saturated and dried. This portion of the bed that is saturated and dried becomes more distant from the support as new layers are added.

As an example of a typical process for forming a powder bed using a single jet with raster motion on a rectangular substrate, if a 35 volume % slurry of 1 micron alumina powder is jetted through 127 micron diameter orifice at a flowrate of 2.0 cc/minute and a raster velocity of 2.5 m/second with spacing between successive raster lines of 150 microns, the height of the wet layer h* (before any slip casting) of slurry will be approximately 89 microns. This in turn will lead to a powder bed layer of approximately 56.5 microns thickness if the powder achieves a packing fraction of 55%.

SLURRY COMPOSITION

Slurry based 3D Printing process requires use of well-dispersed powder suspension. One suitable class of candidates are ceramic powder suspensions, including but not limited to: alumina, silicon carbide, silicon nitride and barium titanate. Understanding of surface charge characteristics and solid liquid interface chemistry plays an important role in colloidal processing of ceramic powders.

A suitable slurry may be prepared using 1 micron alumina powder with water as the vehicle. Nitric acid is added to lower the pH and thereby to aid in electrostatically stabilizing the slurry. Polyethyleneglycol (PEG) is added to aid in redispersion of the unbound powder regions of the powder bed after printing, as is explained below. The slurry may typically be formulated at a volume fraction of 35% alumina, 0.05 Molar nitric acid, and PEG of molecular weight 400 and in the amount of 2 weight percent. If the powder used is tungsten carbide powder, then a suitable redispersant is a sodium salt of an acrylic copolymer, sold under the tradename Duramax 3007, by Rohm and Haas company of Philadelphia, Pa. Ball milling of the slurry in a manner known in the art of ceramics processing, creates a well dispersed slurry.

Silicon nitride powder slurry can be stabilized either electrostatically at high pH or sterically using polymeric dispersant. Easily jetable stable slurry with low viscosity can be prepared using tetramethylammonium hydroxide. However, a problem associated with electrostatically stabilized slurry arises during part retrieval process. The powder bed does not spontaneously redisperse into individual powders, possibly damaging the printed part. Powder bed redispersion tendency decreases as slurry milling time increases. It is believed that a hydrolyzed silica like surface dissolves in high alkaline condition and acts as a glue when powders are dried. In addition, in the case of $Si_3N_4$ electrostatic dispersion, sintering additives such as $Al_2O_3$, and $Y_2O_3$ may cause heterocoagulation, which gives rise to non uniform distribution of sintering additives. In this regard, steric stabilization at neutral pH would be an ideal dispersion condition for silicon nitride. Anionic polyelectrolyte Nopcosperse A44 (see below) was used as a dispersion for silicon nitride. By adding 0.2 w/o dispersant, 30 v/o silicon nitride slurry with low viscosity can be prepared at pH 8.5. The powder bed resulting from such preparation also shows less aging effect and good redispersion behavior due to minimized dissolution of silicon nitride.

The detailed compositions and preparation methods for silicon nitride slurry are as follows: The standard slurry composition was 53.44 w/o $Si_3N_4$, 3.21 w/o $Al_2O_3$ (HPA-0.5, available from Ceralox of Tucson, Ariz.), 3.21 w/o $Y_2O_3$ (99.99%, Unocal P/N 5600, available from Molycorp of Fairfield, N.J.), 0.28 w/o 1M potassium hydroxide (KOH), 38.68 w/o deionized water, 1.06 w/o polyethylene glycol (PEG, carbowax polyethylene 400, available from Union Carbide of Danbury, Conn.) and 0.12 w/o Nopcosperse A44 (35%, proprietary blend ammonium polyelectrolyte, available from Henkel Corp. of Ambler, Pa.,). The KOH, PEG and dispersant were mixed first thoroughly with the solvent in a polyethylene bottle before adding powders. Powders were then poured slowly into the solvent followed by milling for 24 hrs using alumina ball media. The slurries were prefiltered using 32 mm size sieve and deaired under vacuum prior to slurry jetting, so as to avoid the evolution of gas bubbles during jetting.

Another class of candidates for use as the slurry are metallic powder suspensions. Fine metallic powder in the size range of 1–5 microns can be obtained in metals including silver, nickel, iron, cobalt, tungsten, molybdenum and others. Metal alloy powders created by gas atomization can also be obtained in the size range of 5–10 microns and are suitable for the formulation of slurries. The slurry vehicle can be water or a wide range of solvents, including ethyl, propyl and methyl alcohol, or mixtures of water and alcohol. Suitable slurries for use with the invention have particle sizes of between 0.2 and 10 microns, and preferably between 0.5 and 2.0 microns.

Another class of candidates for use as the slurry are polymeric powder suspensions, including but not limited to polymethylmethacrylate (PMMA) and styrene.

Suitable binders for the slurry systems mentioned above include those identified in the 3D Printing patents and applications listed above, in light of the following considerations. The binder must not have particles that are too large to permit entry into the pore spaces of the powder bed. Thus, binders that are composed of dissolved material such as dissolved polymers are preferred. An example of such a binder is sold under the tradename JONCRYL 58 by SC Johnson Polymer of Sturtevant, Wis. This material is a styrene acrylic co polymer, supplied at 50 weight % polymer in a solution of water, isopropyl alcohol and ammonia. For use as a binder it is diluted with water to 5 volume % solids.

Returning to a general discussion of the method of 3D Printing using jetting powder layers, after the layer of powder is dried, then the binder is printed upon the powder surface according to known 3D Printing techniques. The binder is then typically dried through the application of heat lamps. The cycle can then be repeated with the application of subsequent layers of slurry.

REMOVE PART FROM POWDER

After the entire geometry is defined by printing binder, the part must be retrieved from the powder bed. This may be accomplished by immersing the entire powder bed in a liquid, typically water, and causing the powder bed in the regions where no binder was printed to re disperse, as discussed in more detail below.

Slurry or paste derived beds offer several advantages to Solid Freeform Fabrication methods. One of the most important is the ability to produce beds with high packing density even when using small particles of one micron size or smaller. Such powder beds are rather cohesive, however, which makes it difficult to remove unbound material from the component. The number of particle to particle contacts per unit volume is high in beds prepared from fine powders at high density. The strength of these particle to particle contacts can greatly affect the mechanical behavior of the bed. In addition to Van der Waals forces between the particles, particle adhesion can be greatly affected by precipitation of dissolved species at the particle necks when the slurry layer is dried. Aqueous alumina slurries at pH 4.5 have a dissolved aluminum ion concentration, $[Al^{3+}]$, of 17 ppm, and reprecipitates as aluminum trihydroxide $(Al(OH)_3)$ at the necks between the particles as the slurry dries. The resulting cementations bridge between the particles will increase the strength of the particle to particle contact and result in a much stronger bed. Similarly, in aqueous silicon nitride slurries, dissolved silica (corresponding to a weight loss of up to 0.1 wt % based on the silicon nitride powder) reprecipitates at the particle contacts, adversely affecting the contact strength. Redissolution of these inorganic cementatious bridges is also often very slow. Thus, it may be very difficult to redisperse the unbound matrix material from around the part by washing with water or solvent.

The impact of Van der Waal forces or cementations bridging can be reduced by addition of additives that modify the nature of the particle-particle contacts. In this way, redispersion of the powder bed can be greatly improved. There are several requirements for this additive. First, the additive should segregate between the particles during drying so as to prevent their close approach so that Van der Waals forces are substantially reduced or to act as a new effective medium which can also reduce Van der Waals adhesion. Second, the segregated additive should act as a diluent so as to prevent the hard precipitation of dissolved species at the necks between the particles. Finally, in the case of 3D Printing, the additive must work in concert with the printed binder so that the additive does not impede the action of the binder in defining the part.

The selection criteria for such an additive are: 1) that it be highly soluble in the solvent used to form the slurry so that it is the last (or almost the last) of the material to slip cast during drying; 2) that it be soluble in the medium that is used to redisperse the powder bed so as to rapidly dissolve in it, and; 3) in the case of 3D Printing, that it be soluble in the liquid vehicle for the binder being used, so that it does not impede the binding action of the binder.

One suitable example for use with 3D Printing is low molecular weight polyethylene glycol, (PEG 400), which is highly effective for aqueous based slurries. The PEG is left at the necks of the particles as the slurry dries. This prevents the reprecipitation of salt bridges at the necks. The PEG is also very soluble in water. The polymer chains will extend as liquid enters the powder bed during the redispersion process, acting as an additional force pushing the unbound particles apart. The alumina and silicon nitride systems have shown similar favorable PEG redispersion characteristics. Beds prepared from alumina slurries containing 2 wt % PEG 400 experience 30.0 wt % redispersion after a 15 minute soak time in water compared to 2.5 wt % for samples with no PEG 400. PEG 400 additions of 2 wt % improved redispersion of beds prepared from aqueous silicon nitride slurries from 7 wt % to 30 wt % relative to slurries containing no PEG 400. The use of PEG is also compatible with aqueous binders, such as Joncryl acrylics, since it readily dissolves in the binder and does not affect the cross linking of the acrylic during curing.

The effectiveness of PEG or other redispersing agent can be increased by choosing the pH of the slurry so as to minimize the formation of dissolved inorganic solids.

With some binders a thermal curing step is required after printing and prior to re dispersion of the unprinted powder in order to prevent the region where binder was printed from re dispersing.

Thus, the complete processing of ceramic parts includes the following considerations regarding binder/slurry compatibility. The slurry will often contain an agent to aid in the eventual re dispersion of the powder bed after the part is fabricated. The binder must be able to penetrate into the fine pores of the powder bed. The binder must be able to bind the powder even in the presence of the re-dispersing agent added to the slurry (typically, this might be accomplished by having the binder be capable of dissolving the redispersing agent within it). The binder must not dissolve in the liquid used for re dispersion. (One way to accomplish this is to use a binder that cross links under the application of heat and is thus rendered insoluble in the liquid used for re dispersion).

Figure 9A:
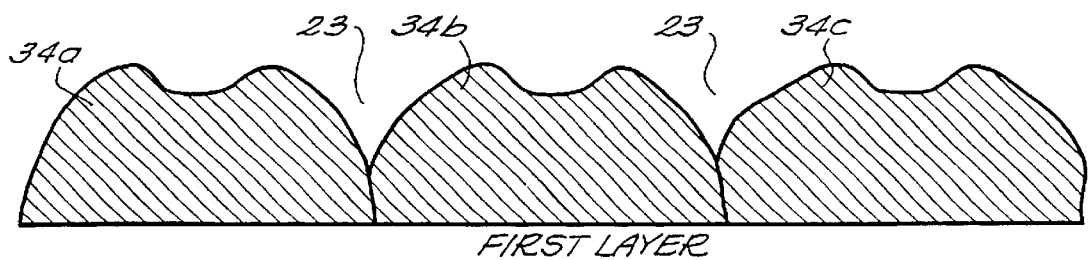
FIGS. 9A and 9B are schematic representations showing the surface texture of a surface made up of a plurality of adjacent lines of slurry, for one and two layers, where the second layer is deposited directly on top of the first layer.
Figure 9B:
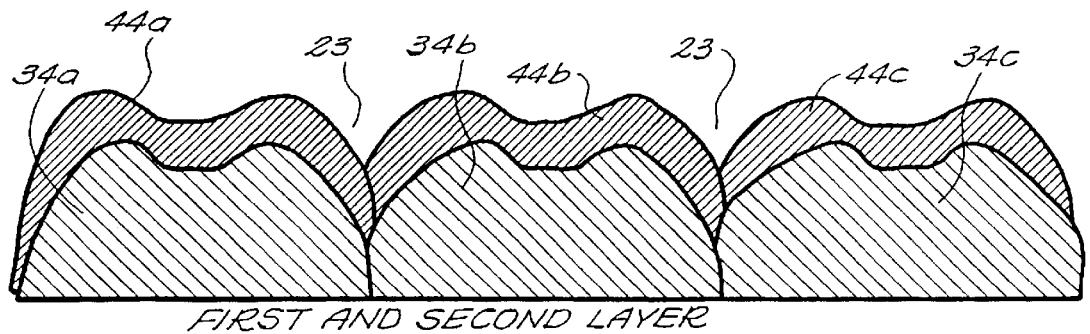

The single slurry jet embodiment discussed above is relatively straightforward to implement and automate. Raster scanning of a single jet does, however, present a challenge in stitching one raster line to the previous raster lines within a layer, as seams of voids may form within the layer between raster lines and as the surface of the layer may have either small protrusions or small valleys between raster lines. These irregularities arise because an individually jetted slurry line, after slip casting, has a cross section somewhat as shown schematically in FIG. 8, with slightly sloped sidewalls and a midline concavity. The resulting cross section of several adjacent lines is shown schematically with reference to FIGS. 9A and 9B. As can be seen, small valleys 23 develop between the lines 34a, 34b, etc. These valleys deepen as each subsequent layer of lines, such as 44a, 44b, etc., is added. The discontinuity between lines is referred to herein as a stitch seam.

Figure 10:
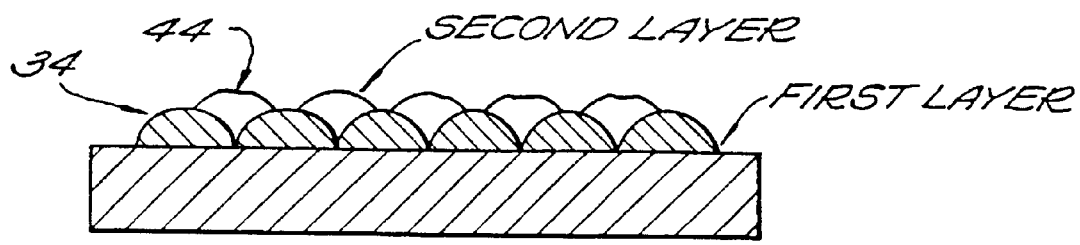
FIG. 10 is a schematic representation showing the surface texture of a surface made up of a plurality of adjacent lines of slurry, for two layers, where the second layer is offset relative to the first layer.

Some improvement to the surface finish may be obtained by offsetting the scan paths of the jets from layer 34 to layer 44. Thus, on a subsequent layer, the jet is scanned between the scan paths of the jet on the previous layer, such as shown in FIG. 10. In the simplest case the scan paths are placed in the center of previous scan paths, with the result that there are two scan patterns which alternate layer to layer. In this case, the entire surface is covered with each layer.

In some cases, it is desirable to deposit slurry so that the condition of the powder bed on both long edges of one deposited line, is the same. For instance, adjacent both edges is no adjacent line, or, adjacent both edges is a line that has already slip cast. An alternative scan path pattern, which allows such symmetry, is shown in FIG. 11, where a first set 54 of lines is deposited, with each line 54a, 54b, 54c, 54d, spaced from its recent neighbor a distance sufficient to permit the recent neighbor to slip cast undisturbed by neighboring lines. The spacing is also sufficient to permit a subsequent set 56 of scanlines 56a, 56b and 56c, to be interlineated between the already deposited lines 54a–d. In this case, both sets 54 and 56 are deposited on nominally the same layer. Adjacent lines in each set can be deposited very quickly in succession without the need to wait for the previous printed line to slip cast entirely into the preceding layer. Further, each line has a symmetric interface with the environment in which it is jetted, as it is being jetted. Those in set 54 are jetted on virgin territory and those in set 56 are jetted adjacent a pair of lines that have already slip cast.

One way to improve stitching between scanlines is to jet a subsequent raster line before the previously jetted raster line has slip cast. (This is in direct contrast to the technique just mentioned, where a new line is not printed next to a line that has not yet slip cast.) The speed with which raster lines may be drawn will depend on the mechanism of the machine and for every machine, there will be a minimum time interval between raster lines, as dictated by the machine. In some machine configurations, for example a circular or otherwise cyclical pattern, great flexibility is available in the timing of adjacent lines.

Figure 22:
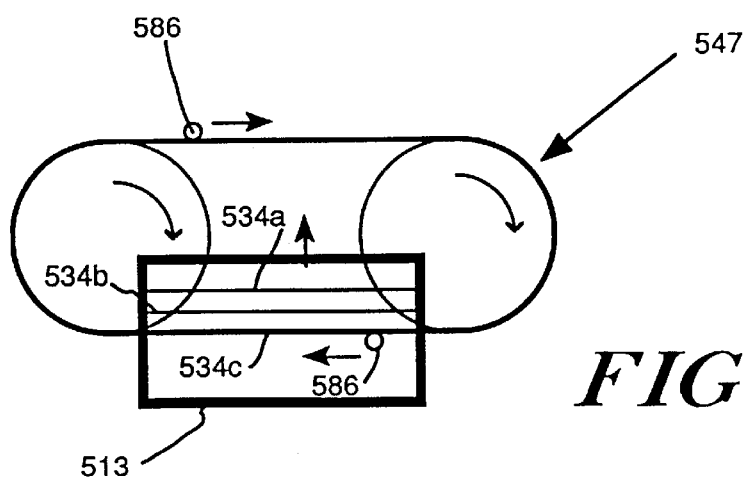
FIG. 22 is a schematic top view representation of another embodiment of the invention, with a cyclical raster scan apparatus.

An alternative mechanism for depositing lines of slurry in a raster pattern is shown schematically in FIG. 22, which is a top view, showing a powder bed 513, over which is situated the mechanism 547. In this case, a track or belt mechanism 547 is used to transport one or more slurry jets 586 (two are shown in FIG. 22) in a continuous loop without reversing the direction of motion of the jets. A relative motion is then established between the mechanism 547 that traverses the jets 586 and the powder bed 513. The mechanism 547 may be moved over the powder bed 513 or the powder bed may be moved under the mechanism (either continuously or by discrete motions between traverses of the jets). Either will result in the deposition of lines 534a, 534b, etc., of slurry in a raster motion. The advantage of this method over that in which the slurry jet is moved on a reciprocating carriage is that the time between arrival of sequential lines of slurry 534a, 534b, remains constant over the full length of a deposited line. Further, as the motion of the jets is continuous and no reversal is necessary, the time between deposition of sequential lines using even a single jet can be short, as compared with the case of a reciprocating carriage, such as is shown in FIG. 14B. Further, this time can be controlled. In the case of the use of a single jet, if a longer time between sequential lines is desired, the velocity of the jet in the nondeposition phase of the loop may be decreased or a dwell may be introduced. If it is desired to decrease the time between sequential lines without increasing the velocity of traverse of the jet over the powder bed, more jets may be added to the loop.

Figure 21B:
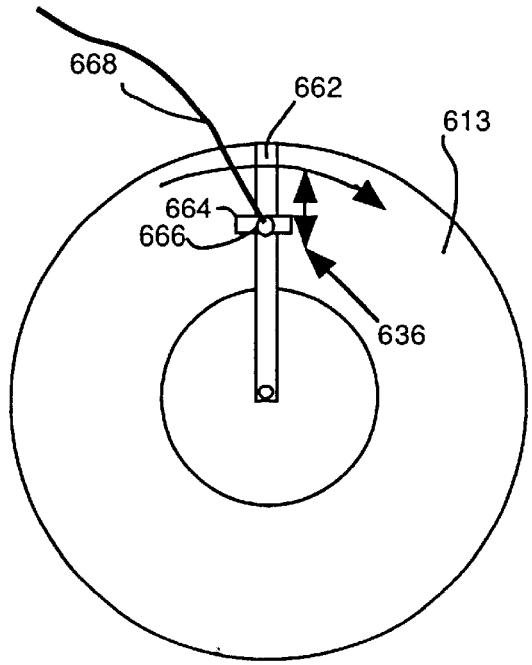
FIG. 21B is a schematic rendition of an apparatus for the jetting of a powder bed, having a rotating jetting head and a stationary slurry support.

For instance, an annular circular powder bed 613 may be created by mounting a slurry jet nozzle 636 in a rotating frame 662 that rotates over a stationary powder bed 613, as shown schematically in FIG. 21B. The slurry jet nozzle 636 is caused to traverse a spiral motion either from the outside toward the inside or from the inside toward the outside. The nozzle, for example, is carried by a slider 664, which starts at the outer diameter of the printhead and advances steadily toward the center with a typical advance of on the order of approximately 0.1 to 2 mm per rotation of the nozzle over the powder bed 613. Special provision for the fluid connection for the slurry to the nozzle 636 is made to accommodate the rotating motion. For example, the nozzle 636 can be mounted in a bearing 666 so that as the nozzle 636 is traversed over the powder bed in its spiral trajectory, the nozzle itself does not rotate and neither does the tube 668 feeding the nozzle have to sustain any twist.

In this manner, at a high enough speed, it is possible to lay down a subsequent "line" before the immediately preceding "line" has slip cast, and thus, the seams between such lines are minimized. (Technically, as the path of the jethead is a spiral, there are not separate lines, rather, there is one long, spiral line, with portions that are adjacent to other portions of the same spiral line.)

An alternative configuration, as shown in FIG. 21A, is to rotate a powder bed 513 under a linearly translating jet 536, moving on a slider 564 along a stationary track 562. A drawback to the rotating powder bed approach shown in FIG. 21A is that care must be taken to avoid motion of the slurry on the powder bed due to the rotation. (The spiral shown in FIG. 21A is exaggerated in its spread, so that it can be seen as a spiral. Typically, each cycle would be closely adjacent the preceding cycle.)

An advantage that is provided by either rotary embodiment, over a raster embodiment that crosses the area, reverses, and deposits a line adjacent to the previously deposited line, is that the duration of time between the deposition of slurry at adjacent locations of sequential "lines" is equal over the full extent of the "line" (in the case of the rotary embodiment, a spiral section of a full rotation). In contrast; in a raster mechanism, the portions of adjacent lines closer to the turn around end will be deposited with a briefer duration there between than portions of adjacent lines distant from the turn around. Thus, the rotary embodiments provide more uniformity.

In either rotating configuration, if the jet flow rate is constant, the rotational speed is constant and the radial spacing of each pass is constant, then the layer thickness will increase toward the center due to the decrease in the peripheral speed of the jet with respect to the substrate. Thus, some form of compensation must be made. A convenient method is to change the rotational speed of the nozzle with respect to the substrate. A preferred embodiment is to change the flow rate of the slurry (lower when the nozzle is closer to the center). This approach has the advantage of maintaining the same time between successive passes of the slurry jet on the substrate.

As an example of a powder bed formed by jetting slurry with relative rotation between the support and the slurry jetting unit, an annular powder bed with an outer diameter of 0.15 meters and an inner diameter of 0.075 meters may be created with a single slurry jet with a diameter of 150 microns, which is traversed radially by a spacing of 250 microns with each rotation of the jet over the powder bed. Such a powder bed can be used to make a multiplicity of small components, for example, components which measure 5 mm on a side. If the rotation rate of the jet over the powder bed is maintained at 600 rpm, the speed of traverse of the jet over the bed will be 4.7 m/sec at the outer periphery of the powder bed and 2.35 m/sec at the inner diameter of the bed. If the flow rate of slurry is 5 cc/min when the jet is at the outer diameter of the bed and decreases linearly to 2.5 cc/minute at the inner diameter, the result will be a uniform liquid application of thickness 71 microns, prior to absorption of the vehicle. An entire layer of this powder bed would be deposited in 15 seconds. If the slurry has a volume fraction of 30% and the powder bed has a packing fraction of 60%, the resulting powder bed layer will be approximately 35 microns thick. Note that the spiral pattern of the jet comes back to the same circumferential location of the powder bed every 0.1 seconds, thus providing that the previously deposited portion of the spiral line will not be fully slip cast and that the new portion of the spiral line can join it with a minimum amount of resulting defects in the powder bed. A lower solids loading in the slurry can help to promote this effect by providing that the slurry takes a little longer to slip cast. Adding agents to increase the viscosity can also have the same effect.

In a mechanical system that scans a nozzle back and forth over the surface of the powder bed, such as shown in FIG. 14B, it will take a certain amount of time to turn the carriage holding the nozzle around in order to create a subsequent raster line. This time period would typically be on the order of 0.25 to one second. If the previous line slip casts significantly in less than one second, then the subsequent line will be put down against a line which has already slip cast. This situation may cause defects within the layer and the creation of surface roughness, as described above, and is to be avoided. One aspect of the current invention is to modify the slurry so that the time to slip cast is longer than the time between passes of the printhead. For example, in the case of a slurry of fine alumina powder, polyethylene glycol may be added to increase the viscosity of the slurry and thereby cause the slurry to take longer to slip cast. For example, the addition of 2 weight % of PEG molecular weight 8000 to an alumina slurry with 30% volume fraction alumina will increase the viscosity of the slurry.

Another aspect of the invention is to eliminate the stitch seams between adjacent jetted lines and to simultaneously increase the rate of deposition of material. Both goals may be accomplished by providing a jet that is elongated in the direction perpendicular to the fast axis of the raster scan (i.e., perpendicular to the direction indicated by the double arrow F in FIG. 3). An elongated jet covers a given area with fewer raster passes and thereby minimizes the number of stitch seams as well as increases the speed of deposition. The elongated jet may, in the limit, cover the full width of the powder bed that is being deposited and in this manner completely eliminate stitch seams. Thus, the nozzle orifice may be a slot, an oval, or any other, suitable elongated shape. A typical aspect ratio for such an orifice is greater than 3:1.

Even in the case where the nozzle orifice is not elongated, it may be any suitable shape, including circular, rectangular, square, etc.

MULTIPLE PARALLEL SCAN WINES

Figure 12:
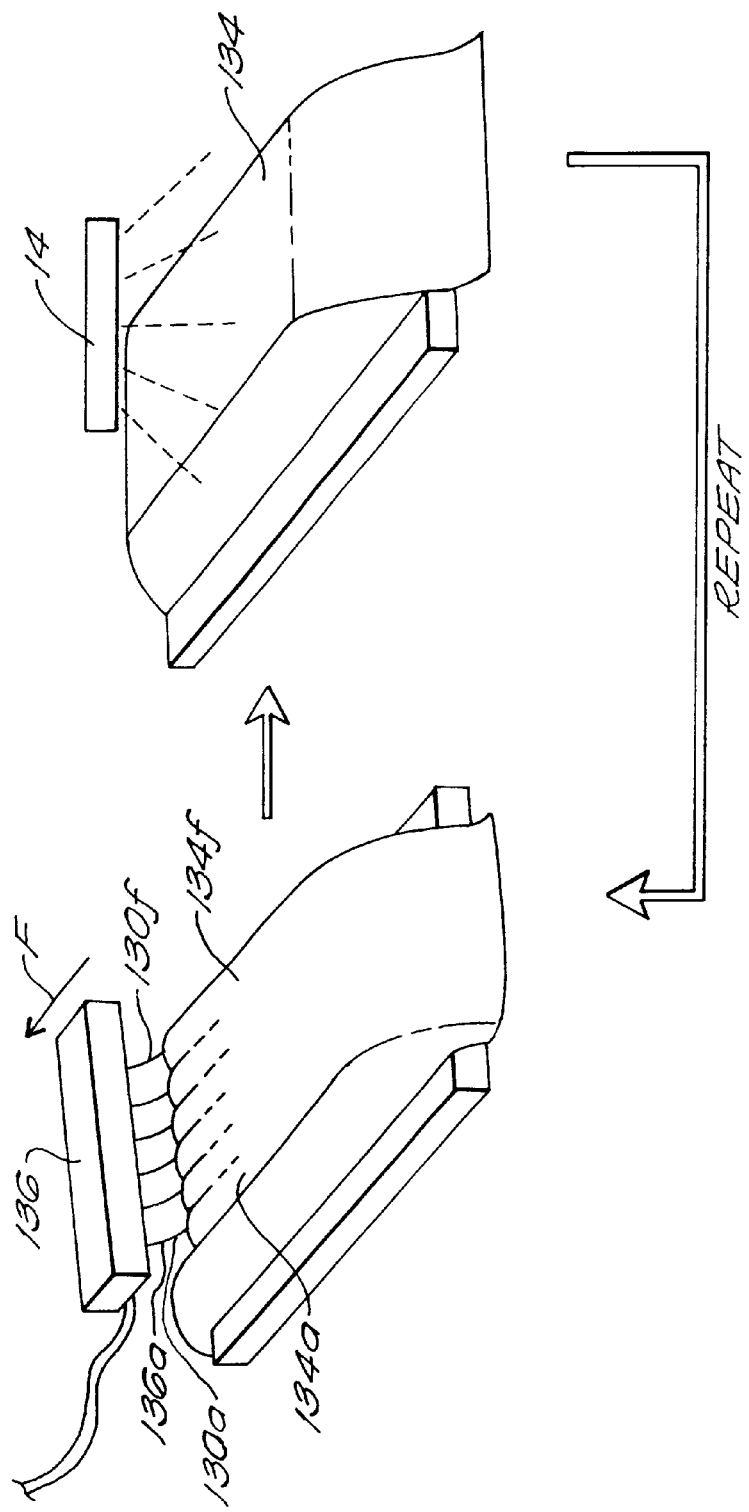
FIG. 12 is a schematic rendition showing the steps of printing and drying slurry with a plurality of simultaneously deposited lines of jetted slurry.
Figure 13:
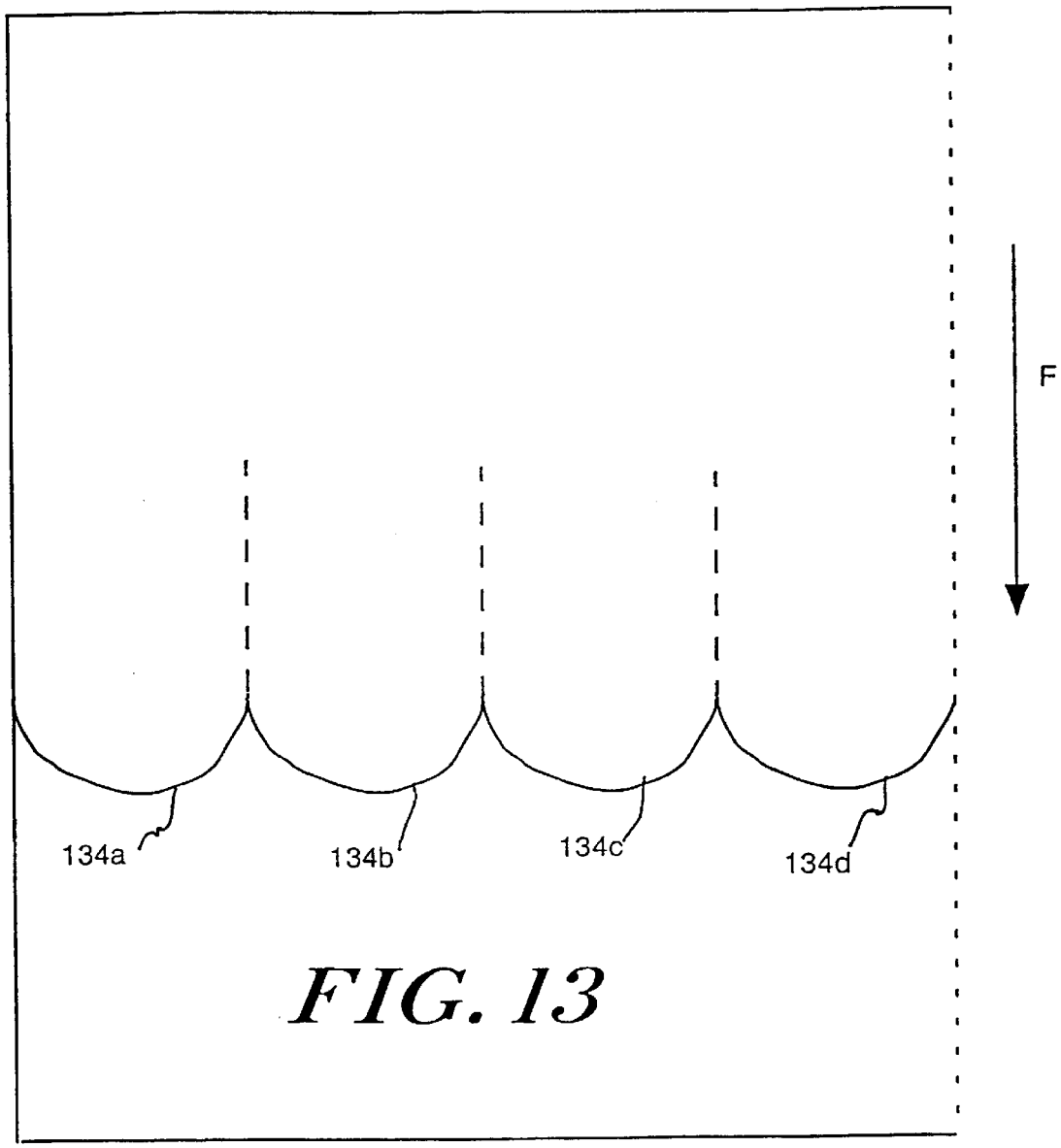
FIG. 13 is a schematic rendition showing a plurality of simultaneously deposited scanlines of jetted slurry, which are coalescing to join without seams between adjacent lines.

A further aspect of the invention is to provide for coverage of a greater width or the full width of a powder bed through the use of a plurality of simultaneously operating jets. In this embodiment, shown schematically with reference to FIG. 12, a plurality of slurry jets 130a, 130b, . . . 130f are spaced apart in a linear array with a spacing between jets that is in the range of several times the cross-sectional dimension of an individual jet. The jets may be produced by a plurality of orifices through a single nozzle head 136. The jets 130a, 130b, etc., are far enough apart to guarantee that the jets do not merge in their transit to the powder bed, but close enough so that the "splat," or spread of adjacent liquid jets will join, as shown schematically with reference to FIG. 13. As the full line of adjacent jets join, an advancing deposition front is created at the surface of the powder bed. The effect is to create a wide swath of slurry on the surface of the powder bed. It is important that the time required for the jets to impact on the powder bed, splat laterally and join to form a line be significantly less than the time by which the liquid will have significantly slip cast into the powder bed. For example, the time required for the splat to occur will be of the order of the size of the splat divided by the velocity of the jet:

$$\text{Time for splat} \cong \frac{\text{Radius of splat}}{\text{Velocity of jet}} \cong \frac{\text{Diameter of jet}}{\text{Velocity of jet}} \quad (7)$$

JET DESIGN

For a typical jet, the diameter is on the order of 0.3 mm and the velocity of the jet is on the order of 2 m/sec. Thus the time for splat spread is approximately 0.15 milliseconds. In contrast, the time required for the liquid vehicle to absorb into the powder bed is on the order of 0.1–10 seconds, depending on the formulation of the slurry, size of the powder particles and other factors. Thus, adjacent jets will splat and join each other before slip casting of the slurry.

For example, 25 circular jets of 350 micron diameter may be disposed on 1 mm center spacing. Slurry is pumped through the device at a total flow rate of 330 cc/minute (13.2 cc/minute for each jet). The wet layer thickness h* that will result from scanning this array over a powder bed at 2.0 m/sec can be calculated from equation (1) either by using the flowrate for each jet and the spacing between jets or by using the total flow rate and the total width of deposited layer expected (25 times the jet spacing). Either calculation gives a wet layer thickness h* of 110 microns. If the slurry volume fraction is 35% and the packing fraction of the powder bed is 60%, the result, after absorption of the liquid vehicle, will be a layer of 64 microns.

Figure 18:
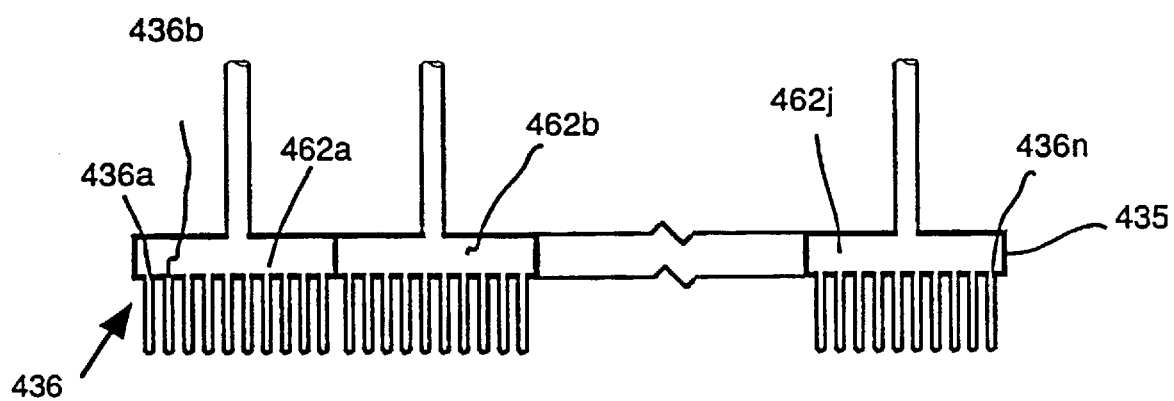
FIG. 18 shows schematically a slurry jet head having multiple orifices, grouped into a plurality of individually controllable modules, each module having a plurality of orifices.

As shown schematically in FIG. 18, a linear array 436 of orifices 436a, 436b, . . . 436n, may be created by drilling through the wall of a square metallic tube 435, such as a stainless steel tube. The holes may be fabricated by any suitable means, such as by photo-etching, electric-discharge-machining or laser ablation. Alternatively an orifice plate may be fabricated and affixed to a plenum, for example with an adhesive cement. Such an orifice plate may be made by any of the above techniques or by electroforming. An orifice plate of ceramic, such as alumina can also be fabricated using the techniques of diamond drilling or laser cutting. Microfabricating orifices in silicon wafers is another method that can be used to fabricate such an orifice plate.

Several considerations enter into the design of the size of the orifices and the spacing between orifices in a linear array. Using larger orifices greatly reduces the probability of print-head clogging. Larger orifices also reduce filtering requirements, since larger particles can now safely pass through the slurry system and print-head. Filtering strategies can therefore focus primarily on guaranteeing the quality needed in the powder bed. However, orifices that are very large, and therefore far apart in the linear array, may make it more difficult to create a powder bed of uniform thickness. Further, the use of larger orifices makes control of the edges of the powder bed more difficult (see below).

COMPARISON OF LINE OF JETS AND WIDE NOZZLE

The creation of a line of deposition through the use of multiple jets impinging on the powder bed has certain advantages over the use of an elongated orifice or slot. Principally, the minimum dimension through which a slurry must pass will be larger for a series of holes than it would be for a slot of the same effective area. For example, an elongated slot of equivalent area to 350 micron holes disposed on 1 mm centers would have a slot thickness (across the non elongated dimension) of 96 microns. Thus, in the case of the holes, an agglomerate of 100 micron dimension would probably pass freely through one of the holes, while it may well get stuck in the slot. Another advantage is that in many materials from which a nozzle may be constructed, it would be easier to fabricate a series of reproducible holes than it would be to fabricate a long slot of uniform dimension.

A further advantage is that with a jet emanating from a slot, the condition at the edges of the jet is different than that at the center of the jet. In particular, capillarity will tend to draw the edge of the jet inward toward the center. In contrast, however, when using a series of small jets, the jet on the edges will travel through the distance from the jet to the powder bed in the same manner as a jet at the center. Further, as described below, the use of a series of jets opens some further opportunities for control of the edge position of a powder bed.

Finally, as described below, powder beds composed of multiple materials may be fabricated by providing different materials to the various jets.

When spacing the orifices, it is helpful to space them apart a distance of between 1.5 and 6 times the diameter of an orifice, with the range of between two and four diameters being preferred.

When using multiple parallel jets, a condition sometimes arises that air bubbles rise through the liquid surface, sometimes creating surface irregularities. The air which is within the pores of the powder bed must be displaced as the liquid vehicle from the slurry penetrates. The desired outcome is that this air is pushed downward in the powder bed, and out some surface other than the top surface. However, in some circumstance, the air may rise through the slurry and form bubbles within it. Bubbling can be avoided by depositing the powder bed as a succession of individual lines, as described above. In this manner, the liquid may infiltrate the powder bed and push the air toward the region of the powder bed where no slurry has yet been printed. However, bubbling does not always occur, and, when it does not, the multiple jet embodiment has significant advantages.

Figure 11A:
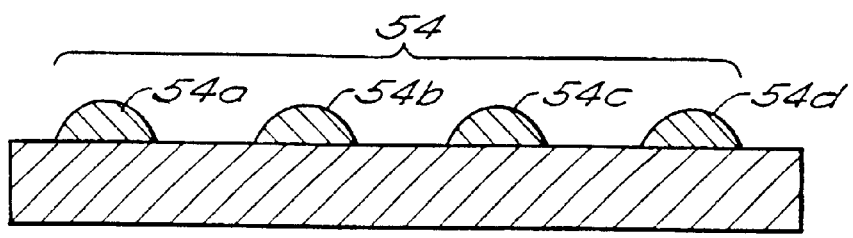
FIGS. 11A and 11B are schematic representations showing the surface texture of a surface made up of a plurality of adjacent lines of slurry, for one nominal layer, where the layer is composed of two sets of spaced apart scanlines that together cover the entire surface.
Figure 11B:
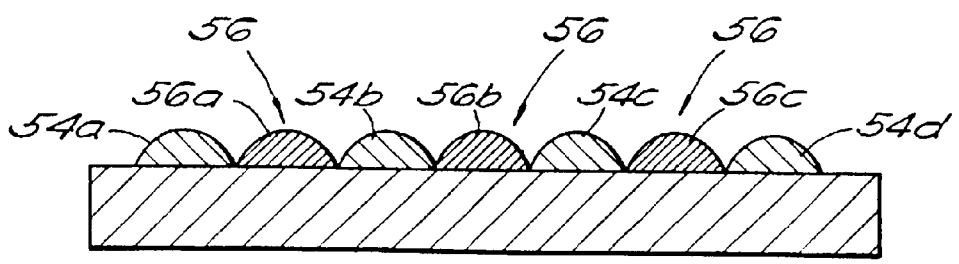

Another pattern for the simultaneous deposition of multiple scanlines is analogous to that discussed above, in connection with FIGS. 11A and 11B and single line depositions. FIGS. 11A and 11B also serve for this discussion. It is possible to simultaneously jet all of the lines of slurry in the first set 54, and then to simultaneously jet all of the lines in the second set 56. In this manner, the advantages of symmetry discussed above in connection with a single jet embodiment are achieved. Using multiple jets allows faster coverage of the area than using a single jet.

REDUCING THICKNESS OF LAYERS

One advantage of the method of the current invention is that extremely thin layers can be created. As noted, layers of 50 micron thickness are routinely practiced. Even thinner layers can be created by increasing the rate of traverse of the jet or jets over the powder bed, however scanning the jets at higher speeds may not be practical, especially in the case of a raster scan where the jets must change direction and re-accelerate with each pass. Somewhat thinner layers can also be created by decreasing the velocity of the slurry in the jet. Generally however, there will be a minimum velocity for a jet, below which the jet will become unstable and change its angle of emission from the orifice. Somewhat thinner layers can also be created by increasing the spacing between jets perpendicular to the fast direction, so long as they remain close enough so that adjacent scan lines merge during the spreading splat. If even thinner layers are required, the slurry can be diluted and used at a lower volume fraction. In this way, dispensing and distributing of the same amount of fluid volume will result in a thinner layer after the vehicle is absorbed.

CONTROL OF CUMULATIVE ANOMALIES

Cumulative effects build up over the course of the deposition of many layers. In addition to controlling the thickness of an individual layer, it is an aspect of the current invention to control these cumulative effects. For example, there may be a variation (for instance, sinusoidal) in the velocity of traverse of a jet or jets in the fast axis traverse over the powder bed. (For instance, such a speed variation would arise due to an eccentricity in a bearing that made up part of the drive of the nozzles.) If this variation has a peak-to-peak amplitude of 4%, then a layer that is nominally 50 microns thick will vary in thickness from 49 to 51 microns in thickness, being thicker where the velocity of traverse was lower. This degree of control would usually suffice for a single layer. However, if the variation in the fast axis scan speed recurs at the same location along the traverse, each layer will be thick in the same location and thin in the same location and the variations will add up. Thus, after 25 layers, the powder bed will vary in thickness from 1225 to 1275 microns. Thus, there will be a cumulative variation that equals the thickness of an individual layer.

It is part of the current invention to make periodic measurements of the height of the powder bed. This can be done, for example, by scanning an optical rangefinder device 41 across the surface of the powder bed. As shown in FIG. 14B, this height information will be used as the basis for control strategies designed to create a level top surface of the powder bed. The range finder may be laser based, and housed on the binder print gantry 43.

The strategies for control depend on the number of jets, as described below.

When a single jet is used to create a powder bed in a raster scan pattern, the rate of traverse in the fast axis is adjusted both between and during fast axis scans in order to compensate for measured errors in the cumulative build up height. Thus, in regions where the powder bed is too low, the jet is scanned at a slower speed and in regions where the powder bed is too high, the jet is scanned at a higher speed.

When an array of a plurality of jets is used, for example a linear array that spans the entire width of the powder bed (perpendicular to the fast axis F), the strategy is somewhat different. Variations along the fast axis that are uniform across the width of the powder bed can still be compensated for by changes in the traverse speed of the jets (as described above for a single jet). However, variations perpendicular to the fast axis of the scan must first be controlled by controlling the flowrate to the jets.

As shown schematically in FIG. 18, the multiple nozzle slurry jetting tool 436 may be divided into a plurality of (e.g. ten) sections 462a, 462b, . . . 462j, with independent control of flow rate possible within each section (a ten nozzle slurry jetting tool may have independent control of each nozzle while a 100 nozzle tool will have independent control over "blocks" of 10 nozzles). Flow rate variations among nozzles in a block will be averaged out by altering the position of the block perpendicular to the fast axis relative to the powder bed, from pass to pass, so that each region experiences an equal number of passes from all jets in a block. Height measurements perpendicular to the fast axis will also allow for the diagnosis of significant changes in the performance of any individual nozzle within the printhead, so that the process can be stopped for maintenance.

Figure 19:
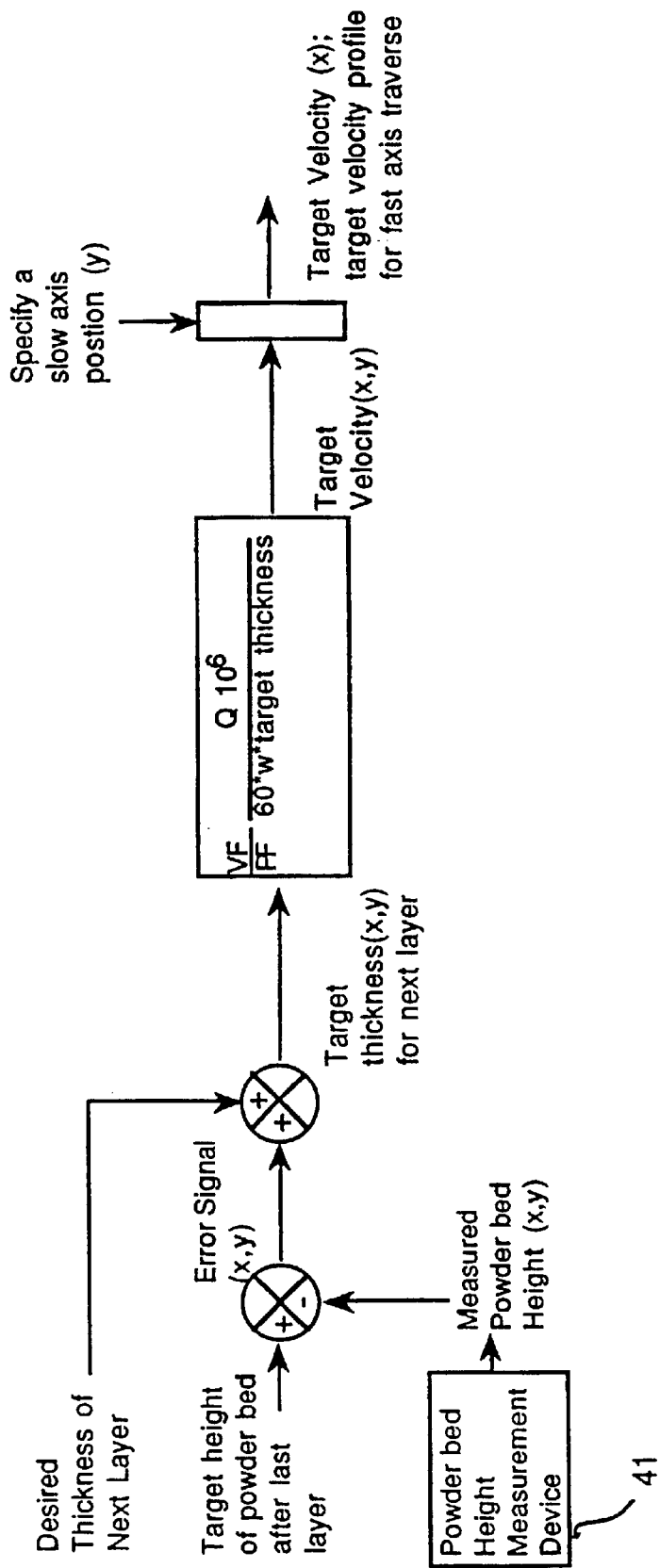
FIG. 19 is a schematic drawing, showing in block diagram form aspects of modules for control of the height of a built powder bed.

FIG. 19 shows, in block diagram form, a control system used to create a flat powder bed at the desired height. Inputs to the control system include the target height of the powder bed after the last layer created, the target thickness of the next layer of powder bed and the measured height of the powder bed after the last layer created. The height is measured by scanning an optical sensor over the surface of the powder bed. For example, the laser range finder 41 (FIG. 14A) may be used. Such a device may be rapidly scanned over the powder bed. For example, using between 10 and 100 traverses of the fast axis. In this manner, a two dimensional map of the height of the powder bed may be created. Interpolation methods such as those known in the art may be used to create analytical representation of the surface of the powder bed based on the measurements taken, represented in FIG. 19 as Powder bed Height (x,y), where x is taken to be a coordinate along the fast axis scan and y is a coordinate along the slow axis scan.

After each layer is deposited and the height of the powder bed is measured, a calculation may be performed wherein the measured height of the powder bed is subtracted from the target height providing an error signal (x,y), which is a function of the position in two axes on the powder bed surface. This error signal represents a thickness of powder bed which is to be made up on the next layer (or more slowly over the next several layers) of deposited powder bed. Where the measured powder bed is shorter than the desired height, an additional thickness will be required and where it is taller, a thinner layer will be called for on the next layer(s) deposited. To this error signal is added the thickness of the next desired layer. This now represents the target thickness for the next layer as a function of position over the powder bed. By using equations (1) and (2), this target thickness can be used to calculate a target jet velocity (x, y) over the surface of the powder bed as a function of position as follows:

$$v(x, y) = \frac{VF}{PF} \times \frac{Q \times 10^6}{60 \times w \times \text{target thickness}}. \quad (8)$$

By specifying a particular position along the slow axis, (y), a Target velocity (x) along a fast axis scan line can be calculated. This velocity can be fed into the control system for the carriage 85 holding the slurry jet head 49. Typically, in the manner known in the art, the carriage 85 will be driven by a servo motor 37, for example, through a cable drive 45, and a linear encoder 47 can be used to provide information about the position of the carriage 85. This position information can then be used to calculate the velocity of the carriage 85. In a manner known in the art, a controller may then be used to maintain the desired velocity of the carriage as a function of its position during the fast axis scan.

This discussion has assumed that a measurement is made of the height of the powder bed after each layer has been deposited. However, in order to save time, it may be desired to make height measurements less frequently, for example, every ten layers. In this case, the error signal should be divided by approximately ten so that the measured error is made up of during the time between measurements. Further, it may be desirable to establish minimum and maximum velocities that will be accepted in the control signal to the carriage. For example, if the velocity control signal swings between 50–150% of the nominal value, it may be desirable to rescale this velocity signal so that it scales between 90% and 110% of the nominal value. This will guarantee that the slurry deposition conditions remain more or less constant during a traverse and thereby avoid the fabrication of defects. It should be noted that velocity control of a carriage is well known in the art and typically, the error in velocity control will be on the order of 2% or less. For this reason, allowing a control signal of 10% of maximum should be sufficient for compensating for errors. Further refinements may be indicated, such as establishing a "dead band" on the error signal to recognize the magnitude of noise in the measurement itself.

RECOGNITION OF EDGE POSITION CONTROL

Figure 17:
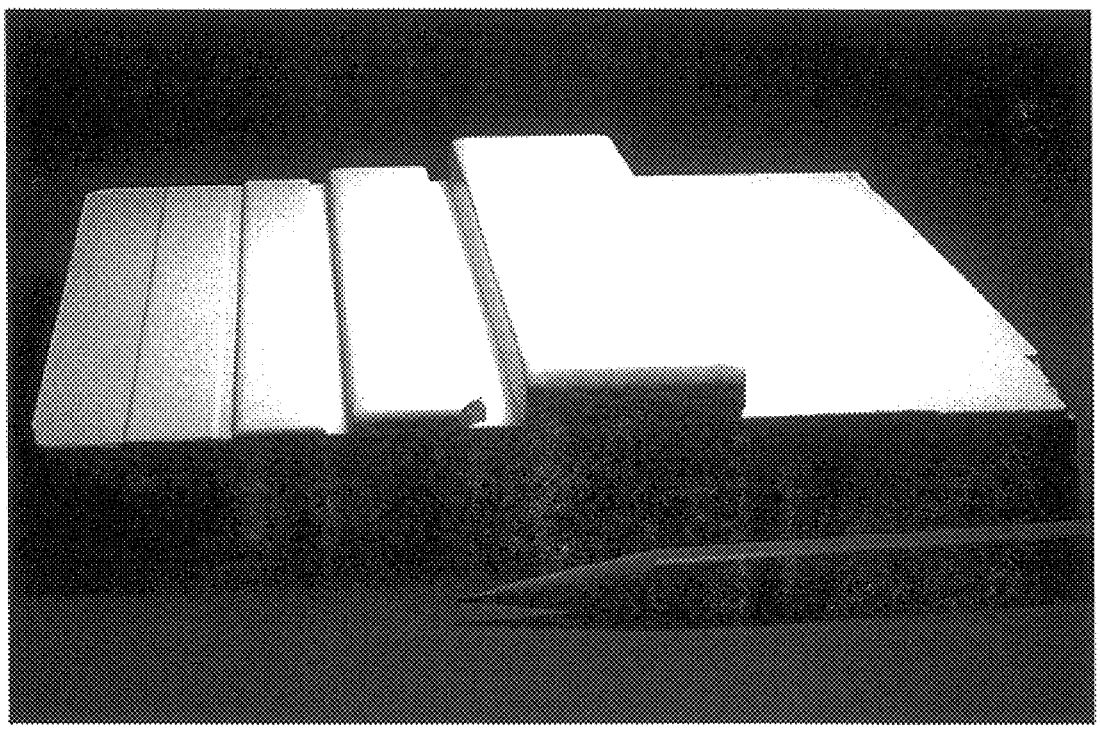
FIG. 17 is a photograph that shows a powder bed made by jetting slurry, illustrating, among other things, highly vertical side walls (along the long axis)

Another aspect of the current invention is the recognition that the control of the edge position of the powder bed can be quite good. In fact, nearly vertical side walls can be created, due to the ability to repeatedly dispense liquid slurry at or near the edges of the powder bed. An example of a powder bed made by jetting is shown in FIG. 17. FIG. 17 is a photograph showing a powder bed that was made by jetting a single jet that was rastered over the surface of a support very sharp edges and vertical walls are evident. Another aspect that helps to define the edges of a powder bed created by traversing a single jet is the fairly rapid stabilization of the line due to slip casting. This results in a good definition of the edge condition. In the case of creating a powder bed with an application of an array of jets, it may be advantageous, for each layer, to first use a single jet to traverse the edges of the powder bed and to define those edges well and to then follow with the linear array between those edges.

PRODUCTION LINE

The foregoing has described embodiments with an essentially stationary support 12, upon which successive layers of jetted powder slurry and patterns of binder are deposited, with a slurry deposition 49 head moving along a fast axis to deposit the slurry, followed by a binder deposition head 51 rastering over the surface.

Figure 15:
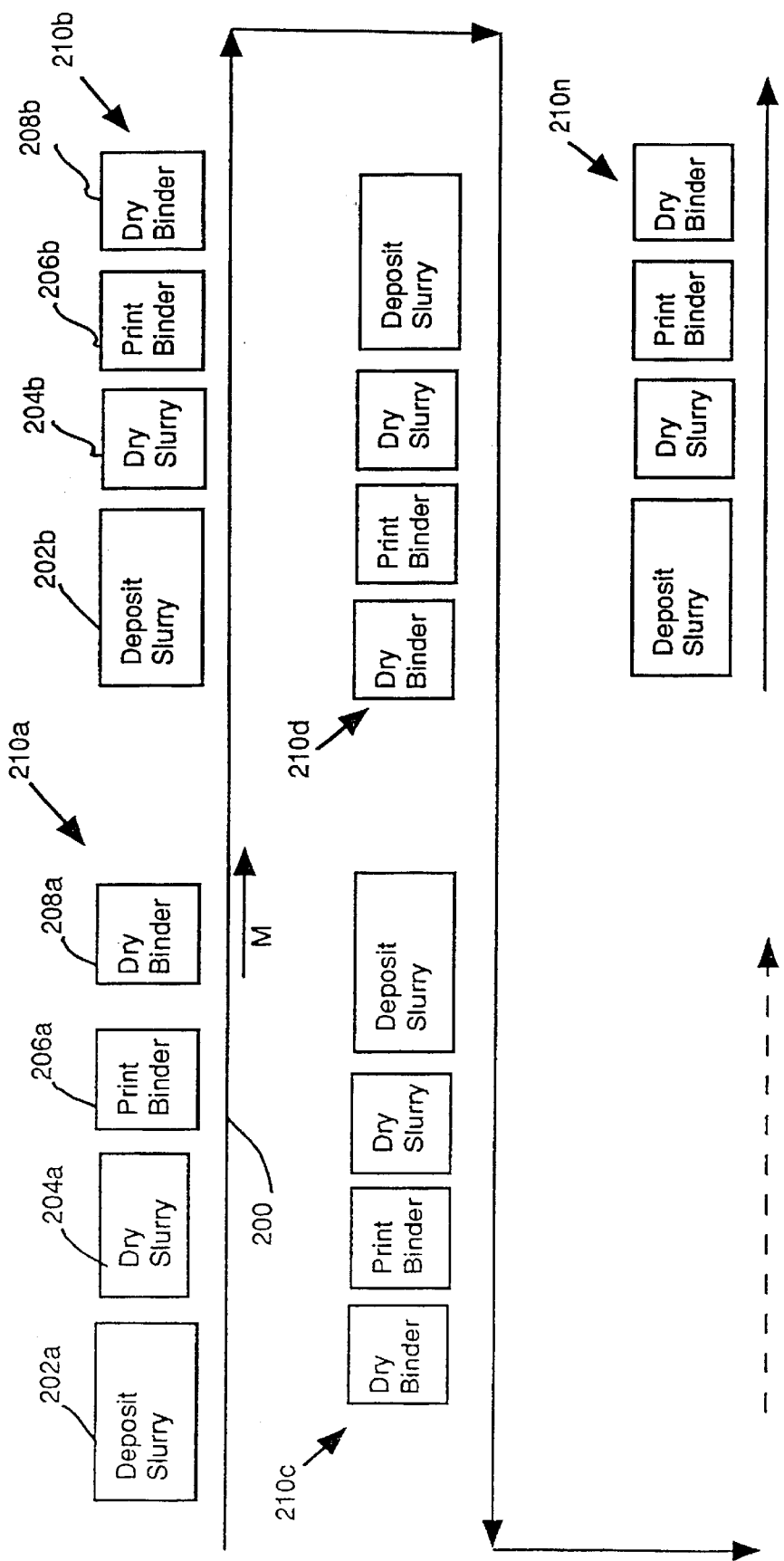
FIG. 15 is a schematic representation of a production line with multiple serial stations for slurry deposition, slurry drying, binder printing and binder drying.

It is also possible to apply the slurry and the binder at different locations along a production line, where the growing part is supported by a web that advances along the line, from station to station. Such an embodiment is shown schematically with reference to FIG. 15. In such a case, a first, upstream slurry deposition station 202a is encountered by a web 200 moving along the direction indicated by the arrow M. The slurry deposition stage includes a stationary head, with a plurality of jets spaced across the width of the web. They are turned on for a period of time, during which the web advances underneath, receiving a layer of slurry. The slurry layer slip casts, as described above, and is dried 204a, such as by heat lamps further down stream. The web-borne powder bed next encounters a binder deposition station 206a, where binder is deposited according to a preselected pattern. The binder may be deposited through masks, as described in co pending application, U.S. Ser. No. 08/831,636, or by a moving binder deposition head, which traverses the width of the web at a relatively high speed, compared to the speed at which the web advances past the binder deposition station. The binder deposition head may also move somewhat along the direction that the web is moving. Next, the binder is optionally dried 208a at a binder drying station. These first set of stations are part of a first stage 210a.

Further down stream are additional stages 210b, 210c, etc. each including stations for the jetting of slurry, drying of same, and printing of binder. This serial, web embodiment may be useful for certain types of applications, such as very high volume applications.

Further, with multiple stages for jetting powder layers and printing binder, it is easier to apply a different type of slurry (different powder, different viscosity, different slurry solids composition, etc.) and a different type of binder at different portions of the building part. This can be done simply by supplying the different material to the different stations. Rather than a linear assembly line type line, the web path may be cyclic, returning to the original stage and then passing again through the same stages, or it may reciprocate among two or more stages.

Figure 16:
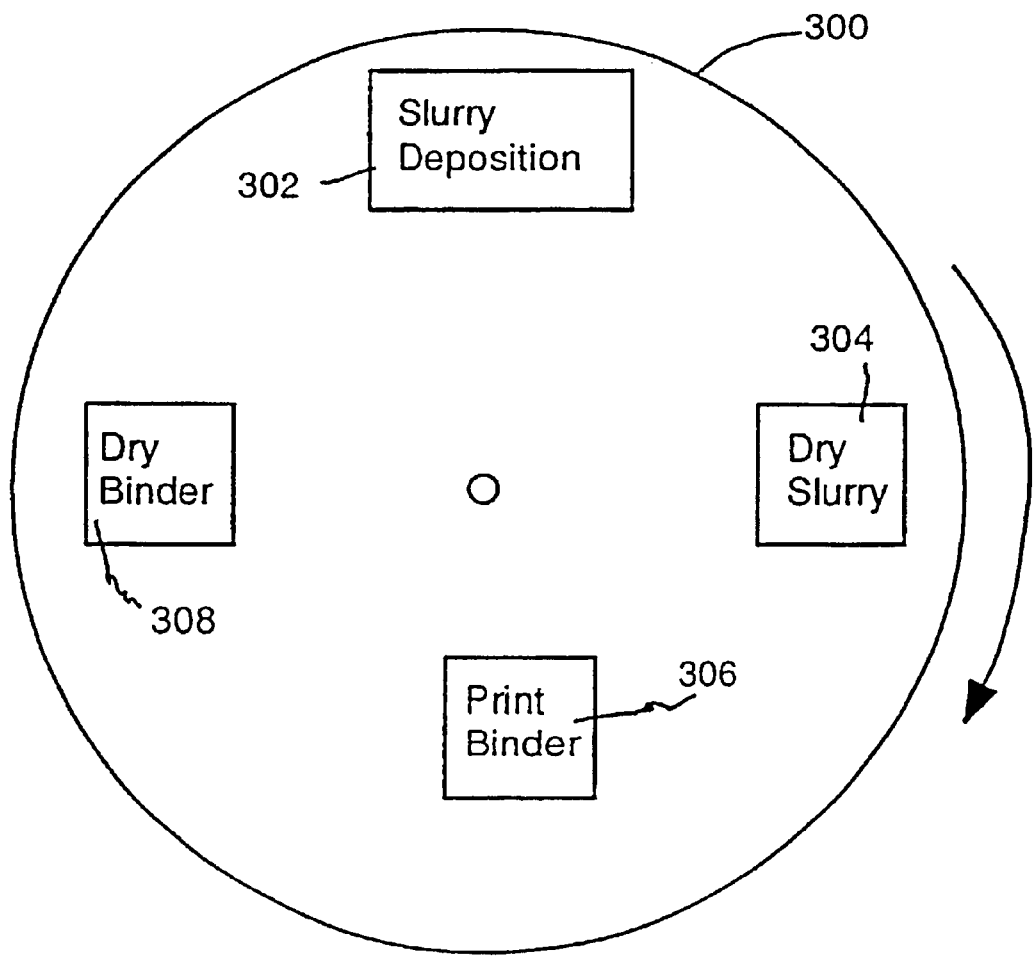
FIG. 16 is a schematic representation of a rotary production set up.

Another embodiment of a multiple station processing line is a rotary set up, shown schematically in FIG. 16. In such an embodiment, the forming powder bed, and part moves, for instance on a web or a turntable 300, from a slurry jetting station 302, to a drying station 304 to a binder printing station 306, a binder drying station 308, and back to the same slurry jetting station 302, from which the various processes are repeated again.

For some applications it may be desirable to vary the composition of the powder bed within a single component. Such a component may be made by three dimensional printing (although it can also be made by other methods). The composition can be varied in different ways. The composition can be varied from layer to layer by jetting a different slurry for each layer. For instance, as shown in FIG. 14B, different slurry heads 49 and 49* can be used. Slurry heads 49 and 49* (49* is shown only in FIG. 14B) each include at least one slurry nozzle 36, 36*, and are each carried on their own carriage 85, 85*. As shown, each are driven by independent motors 37, 37* along the same track 33. Alternative embodiments are possible where a shared motor is used or where separate tracks are used. Alternatively, in a production line embodiment (discussed above), different slurry stations can be supplied with different slurries.

In addition, the composition can be varied within a layer by jetting different slurries in different locations. This may also be practiced by using two slurry heads 49, 49*, each one jetting a different material, as shown in FIG. 14B. A number of raster lines of material A can be deposited, and then a number of raster lines of material B can be deposited. In this manner, a powder bed can be created with stripes of different materials. Alternatively, the jets of different materials can be moved in a vector fashion and thereby describe regions of different material of higher geometric complexity. The apparatus shown in FIG. 14B could also be used for vector scanning. However, typically a vector scan apparatus would have a different track system, rather than using the relatively heavy track 33, as shown.

Further, when combined with 3D printing, the requirements on the accuracy of location of deposition of different materials is not so strict. This is because the external geometry of the part will be defined by where the binder is printed. Thus, when depositing the different slurry materials, the slurry material can be intentionally allowed to extend beyond the external boundary of the part.

JETTING INDIVIDUAL DROPLETS

A further possibility is to create the different regions of powdered material by printing individual droplets of slurry, as opposed to a continuous jet. This can be accomplished by using continuous jet inkjet printing technology, which is discussed in more detail below. Special account must be taken of the time required for slip casting of the liquid vehicle so that the powder bed thus formed does not have defects at the interfaces between the droplet impacts.

In the foregoing, emphasis has been directed toward embodiments where the slurry is jetted such that it contacts the surface of the growing powder bed as a continuous stream, rather than as individual droplets. This was illustrated with reference to FIG. 5. One reason for this condition is that control over the condition of the slurry jet is provided, as discussed above, as compared to a random spray, where there is no control over whether or not an individual droplet has slip cast on the powder bed at the time of arrival of a following droplet.

Relatively precise control can, in theory, be provided by continuously emitting slurry from the nozzle orifice, as in the embodiment discussed above in connection with a continuous stream of slurry. The difference is that the nozzle is spaced from the powder bed such that the stream has time to break up into individual droplets before impacting the powder bed. Thus, individual droplets can be prevented from hitting the powder bed, for instance by diverting individual droplets into a slurry collector or gutter. This type of apparatus is in some ways similar to what is known in ink jet printing technology as "continuous" printing, because the stream of printing material is continuous at the nozzle, and is made discontinuous downstream of the nozzle. Techniques for using such continuous ink jet printing for printing of binder are described in the co-pending, co-assigned U.S. Ser. No. 08/596,707, entitled HIGH SPEED, HIGH QUALITY THREE DIMENSIONAL PRINTING. The same techniques are also applicable in the jetting of individual controlled slurry droplets.

The diversion to the gutter is typically effected by electrostatically charging the stream of slurry, and then sending the stream through an electric field, to deflect the stream either toward or away from the collector, which may also be charged appropriately to attract or repel the individual droplets. Thus, individual droplets can be prevented from impacting the powder bed, and can also be precisely aimed and timed. Therefore, the condition of previously deposited droplets (in terms of their degree of slip casting into the porous bed) upon contact by subsequently deposited droplets can be controlled. Thus, the designer can cause a second droplet to contact the powder bed adjacent a first particle at any point along the spectrum of slip casting from fully liquid (before any slip casting) to fully slip cast. The diverted, unprinted slurry is recycled for subsequent use.

An important application of the creation of a powder bed with individual droplets is the creation of a powder bed with different materials in different locations. For example, as shown in FIG. 14B, two slurry jetheads 49 and 49* could be used to first define an island of slurry material with one of the jetheads 49 and then to surround the island with the slurry from the second jethead 49*.

The foregoing discussion has shown rectangular powder beds for illustration. However, any shape that can be scanned, such as by raster or vector scanning, can be fabricated. These include virtually any shapes, such as circular, irregular, even shapes with internal openings. All that is required is control over where the slurry jet travels, and when it is dispensing slurry and when it is not. For instance, a part having the shape of the part on the right hand side of FIG. 20 can be made with the process of the invention, using either a vector scan embodiment or a continuous ink jet type embodiment. (In actuality, however, the part shown was made using binder.)

CREATION OF POWDER BED ALONE IS ASPECT OF INVENTION

The aspect of the invention for building a powder bed from layers using jetting techniques has been described primarily in connection with 3D Printing,. However, it is novel and useful in its own right, and can be used with many different techniques that require layers of fine powder, such as: selective laser sintering (SLS) (heat cross linking polymer in slurry).

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A method for creating a powder containing body, said method comprising the steps of:
   a. providing a support;
   b. over a selected area of said support, depositing a liquid slurry that contains a first powdered material in a continuous stream to form a first layer of powdered material;
   c. maintaining said deposited layer of powdered material under conditions such that the liquid content of said first layer is reduced;
   d. depositing a binder material at selected regions of said layer, which binder will cause said layer to become bound at said selected regions, and successive layers to become bound to each other at said selected regions; and
   e. over a portion of said selected area of said support, depositing liquid slurry in a continuous stream to form an additional layer region.

2. The method of claim 1, said step of depositing a continuous stream of said liquid slurry comprising the step of controlling the location and timing of said continuous stream of said liquid slurry.

3. The method of claim 1, further comprising the steps of repeating said maintaining, depositing a binder material and depositing slurry steps (c, d and e) a plurality of times until a desired thickness of powdered material has been deposited.

4. The method of claim 3, said step of maintaining said deposited layer such that said liquid content is reduced, comprising the step of maintaining said deposited layer region of powdered material such that said liquid slips into porosities of a previously deposited layer.

5. The method of claim 3, said steps of maintaining said deposited layer region such that said liquid content is reduced comprising drying said slurry layer.

6. The method of claim 1, said drying step comprising subjecting said deposited layer region to heat.

7. The method of claim 1, said step of depositing said additional layers comprising the step of rastering over said selected area a jethead and jetting from said jethead said slurry onto said portion of said selected area while rastering.

8. The method of claim 1, said step of depositing said additional layer comprising the step of vectoring over said selected area a jethead and jetting from said jethead said slurry onto said portion of said selected area while vectoring.

9. The method of claim 1, said step of depositing said additional layer comprising the steps of passing over said portion of said selected area a jethead while simultaneously jetting a plurality of parallel continuous streams of said slurry from said jethead onto said portion of said selected area.

10. The method of claim 1, said step of depositing in a continuous stream comprising jetting a plurality of streams of said slurry onto said portion of said selected area such that each of said streams is deposited closely enough to an adjacent stream in space and time such that upon contact with a previously deposited layer, liquid from said adjacent streams merges before said liquid has completely slipped down into porosities of said previously deposited layer.

11. The method of claim 1, said step of depositing slurry comprising the step of depositing a slurry containing particles of between 0.2 and 10 microns.

12. The method of claim 1, said step of depositing slurry comprising the step of jetting said slurry through a nozzle having a greatest orifice dimension of between 50 and 1,000 microns.

13. The method of claim 12, said step of depositing slurry comprising the step of jetting said slurry through a nozzle having a greatest orifice dimension of between 100 and 400 microns.

14. The method of claim 1, said step of depositing slurry comprising the step of jetting said slurry through an elongated nozzle having an orifice aspect ratio of greater than 3:1.

15. The method of claim 1, said step of depositing slurry comprising the step of depositing a slurry having a solids volume fraction of between 5 and 55.

16. The method of claim 1, said step of depositing slurry comprising the step of depositing a slurry containing particles chosen from the group consisting of ceramics, metals and polymers.

17. The method of claim 1, said step of depositing slurry comprising the step of depositing a slurry that contains a redispersant.

18. The method of claim 17, said step of depositing a slurry that contains a redispersant comprising the step of depositing a slurry that contains a redispersant that is:
   a. soluble in the liquid used to form the slurry;
   b. soluble in a liquid medium that can redisperse the formed layers of powder; and
   c. soluble in any liquid vehicle of said binder material.

19. The method of claim 18, said redispersant comprising substantially the last of any material of said slurry to slip cast during drying, such that residues thereof form at necks between powder particles.

20. The method of claim 9, said step of jetting a plurality of parallel streams comprising the step of jetting said streams spaced apart a distance of between 1.5 and 6 diameters of said parallel streams.

21. The method of claim 1, said step of depositing a liquid slurry comprising the step of jetting a plurality of streams, at least two of said streams having slurries of different compositions.

22. The method of claim 1, said step of depositing a binder comprising the step of depositing a binder chosen from the group consisting of: a colloidal suspension of ceramic particles, a solution of metal salt, a styrene acrylic co-polymer.

23. The method of claim 1, said step of depositing a binder comprising the step of depositing a binder that:
   a. penetrates into pores of the powder bed;
   b. binds the powder in the presence of any re dispersing agent; and
   c. is insoluble in any liquid used for re-dispersion of any unbound powder.

24. The method of claim 1, said binder comprising a heat curable polymer, further comprising the step of, after depositing said binder, heating said selected regions of said layer to cure said binder.

25. The method of claim 1, further comprising the steps of:
   a. measuring the height of said deposited additional layer at selected locations of said selected area; and
   b. adjusting the rate of delivery of slurry at selected locations of subsequently deposited layers, based on said measured height at said selected locations of additional layer.

26. The method of claim 1, said step of depositing said slurry comprising the step of jetting streams of slurry of a layer in register with streams of slurry of the immediately preceding layer.

27. The method of claim 1, said step of depositing said slurry comprising the step of jetting streams of slurry of a layer offset from streams of slurry of the immediately preceding layer.

28. The method of claim 3 further comprising, after the desired number of jetted layers of powder with printed regions of binder has been produced, the step of dispersing any unbound powder from any bound powder.

29. The method of claim 28, said step of dispersing said powder comprising the step of contacting a solvent to said unbound powder.

30. The method of claim 1, said support comprising a movable support, configured to move said selected area past a first processing stage, which includes a slurry deposition station and a binder deposition station, said method further comprising the steps of moving said selected area to said slurry deposition station of said first processing stage and, after slurry has been deposited, moving said selected area to said binder deposition station of said first processing stage.

31. The method of claim 30, said movable support comprising a movable web.

32. The method of claim 30, said movable support comprising a rotatable support.

33. The method of claim 30, said movable support configured to move said selected area past a plurality of processing stages, each said stages comprising a slurry deposition station and a binder deposition station, further comprising the steps of moving said selected area to a slurry deposition station of an additional processing stage and, after slurry has been deposited, moving said selected area to a binder deposition station of said additional processing stage.

34. The method of claim 1, said step of depositing a liquid slurry comprising the step of causing relative rotation between said support and a slurry deposition unit during said step of slurry deposition.

35. The method of claim 34, said step of causing relative rotation comprising the step of rotating said slurry deposition unit relative to a stationary support.

36. The method of claim 35, further comprising the step of translating a portion of said slurry deposition unit relative to said support, while rotating, such that a spiral path of slurry is deposited on said support.

37. The method of claim 34, said step of causing relative rotation comprising the step of rotating said support relative to a stationary slurry deposition unit.

38. The method of claim 1, said step of depositing an additional layer of slurry having a solid volume fraction, onto a powder bed having a packing fraction, comprising the step of depositing a thickness, h*, of slurry such that a film forms, including said deposited slurry and previously deposited powder, said film having a saturation thickness, $h_{sat}$, that is less than a critical cracking thickness CCT, where:

$$h_{sat} = h^* \left( \frac{1 - \text{solid volume fraction of slurry}}{1 - \text{packing fraction of powder bed}} \right), \text{ and}$$

$$CCT = \left( \frac{K_c}{1.4J} \right)^2,$$

where $K_c$ is the fracture resistance of the film, and J is the biaxial stress to which the film is exposed and $$J = \frac{2\gamma_{LV} \cos\theta}{r_{pore}},$$

where $\gamma_{LV}$ is the surface tension of the slurry, θ is the contact angle of the slurry on the solid phase, and $r_{pore}$ is the pore radius in the film.

39. The method of claim 1, said step of depositing an additional layer of slurry comprising the step of composing the slurry to avoid layer cracking by adjusting at least one of the following factors as indicated:
   a. increasing the volume fraction VF of the slurry;
   b. decreasing the surface tension, $\gamma_{LV}$, of the slurry;
   c. increasing the fracture resistance, $K_c$ of the film;
   d. increasing the contact angle, θ, of the slurry on the solid phase; and
   e. increasing the pore radius of the film.

40. The method of claim 25, said step of depositing slurry comprising the step of moving a slurry jethead over said selected area, said step of adjusting the rate of delivery comprising the step of varying the speed at which said jethead passes over said area.

41. The method of claim 9, further comprising the step of varying the rate of delivery of slurry among said plurality of parallel streams to correct for any irregularity in surface height of said formed additional layer that may be present.

42. An apparatus for making three-dimensional objects comprising:
   a. a support having a surface;
   b. a slurry delivery unit;
   c. a slurry delivery drive unit, configured to drive the slurry delivery unit to deposit a layer of slurry over a selected region of said surface;
   d. a liquid reduction unit arranged to reduce the liquid content of a layer of deposited slurry;
   e. a binder delivery unit; and
   f. a binder delivery drive unit configured to deposit binder material at selected regions of a layer of deposited slurry.

43. The apparatus of claim 42, said slurry delivery unit comprising a nozzle.

44. The apparatus of claim 43, said nozzle having an orifice having a greatest opening dimension of between 100 and 400 microns.

45. The apparatus of claim 42, said slurry delivery unit comprising a head having a plurality of spaced apart orifices.

46. The apparatus of claim 45, said orifices having a greatest opening dimension of between between 50 and 1000 microns.

47. The apparatus of claim 45, said orifices being spaced apart a distance of between 1.5 and 6 diameters of streams of slurry jetted from said orifices.

48. The apparatus of claim 42, said slurry delivery drive unit configured to raster said slurry delivery unit over the surface of said support.

49. The apparatus of claim 42, said slurry delivery drive unit configured to sweep said slurry delivery unit across the surface of said support.

50. The apparatus of claim 42, said slurry delivery drive unit configured to vector said slurry delivery unit over the surface of said support.

51. The apparatus of claim 42, further comprising a slurry recovery unit, configured to capture slurry delivered from said slurry delivery unit at times when it is not desired to deposit slurry on said support.

52. The apparatus of claim 42, further comprising a layer surface height measurement unit.

53. The apparatus of claim 52, said slurry delivery drive unit further comprising a surface height control module that takes as an input a signal from said surface height measurement unit and uses that signal to vary the delivery of slurry so as to control the height of said surface that is formed.

54. The apparatus of claim 52, said surface height measurement unit comprising a laser rangefinder.

55. A process for making a component comprising the steps of
   a. depositing a layer of a powder material in a region by jetting a continuous stream of a slurry that contains said powder material;
   b. applying a further material to one or more selected regions of said layer of powder material which will cause said layer of powder material to become bonded at said one or more selected regions;
   c. repeating steps (a) and (b) a selected number of times to produce a selected number of successive layers, said further material causing said successive layers to become bonded to each other; and
   d. removing unbonded powder material which is not at said one or more selected regions to provide the component.

56. The method of claim 1, said step of depositing slurry comprising the step of depositing a slurry containing particles of between 0.5 and 2 microns.

* * * * *

UNITED STATES PATENT AND TRADEMARK OFFICE
CERTIFICATE OF CORRECTION

PATENT NO.    : 6,596,224 B1
DATED         : July 22, 2003
INVENTOR(S)   : Sachs et al.

It is certified that error appears in the above-identified patent and that said Letters Patent is hereby corrected as shown below:

Title page,
Item [60], Related U.S. Application Data, delete ", and provisional application No. 60/018,316, filed on May 24, 1996" so the item reads --            Related U.S. Application Data
[60] Provisional application No. 60/050,015, filed on Jun. 13, 1997 --
Item [56], References Cited, U.S. PATENT DOCUMENTS, after U.S. patent 5,940,674, Sachs et al., please add:

| Patent No. | Date | Inventor | Class | Subclass | Filing Date |
|---|---|---|---|---|---|
| -- 4,505,987 | 3/19/85 | Yamada et al. | 428 | 553 | 11/10/81 |
| 4,664,948 | 5/12/87 | Moore et al. | 427 | 134 | 8/22/83 |
| 5,038,014 | 8/6/91 | Pratt et al. | 219 | 121.64 | 2/8/89 |
| 5,059,266 | 10/22/91 | Yamane et al. | 156 | 64 | 5/23/90 |
| 5,121,329 | 6/9/92 | Crump | 364 | 468 | 10/30/89 |
| 5,122,632 | 6/16/92 | Kinkelin | 219 | 121.63 | 10/16/90 |
| 5,126,529 | 6/30/92 | Weiss et al. | 219 | 121.6 | 12/3/90 |
| 5,136,515 | 8/4/92 | Helinski | 364 | 468 | 11/7/89 |
| 5,189,781 | 3/2/93 | Weiss et al. | 29 | 527.2 | 8/3/90 |
| 5,204,055 | 4/20/93 | Sachs et al. | 419 | 2 | 12/8/89 |
| 5,429,790 | 7/4/95 | Takahashi | 419 | 9 | 3/25/94 |
| 5,433,280 | 7/18/95 | Smith | 175 | 336 | 3/16/94 |
| 5,490,882 | 2/13/96 | Sachs et al. | 134 | 1 | 11/30/92 |
| 5,510,066 | 4/23/96 | Fink et al. | 264 | 40.1 | 10/4/94 |
| 5,529,471 | 6/25/96 | Khoshevis | 425 | 112 | 2/3/95 |
| 5,531,955 | 7/2/96 | Sugikawa | 419 | 2 | 9/13/94 |
| 5,540,884 | 7/30/96 | Chiao | 419 | 47 | 3/18/93 |
| 5,616,423 | 4/1/97 | Sanjyou et al. | 428 | 632 | 7/6/94 |
| 5,622,769 | 4/22/97 | Kozuka et al. | 428 | 209 | 2/10/94 |
| 5,697,043 | 12/9/97 | Baskaran et al. | 419 | 30 | 5/23/96 -- |

Signed and Sealed this

Twenty-fourth Day of August, 2004

JON W. DUDAS
*Director of the United States Patent and Trademark Office*